(12) United States Patent
Yabe

(10) Patent No.: US 8,830,546 B2
(45) Date of Patent: Sep. 9, 2014

(54) APPARATUS AND METHOD DETERMINING WHETHER OBJECT SPECIFIED TO ENABLE AN UNDERLYING OBJECT TO BE SEEN THERE THROUGH IS INCLUDED IN DATA TO BE PRINTED, AND MEDIUM HAVING INSTRUCTIONS FOR PERFORMING THE METHOD

(75) Inventor: Takashi Yabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/410,464

(22) Filed: Mar. 2, 2012

(65) Prior Publication Data
US 2012/0170061 A1 Jul. 5, 2012

Related U.S. Application Data

(62) Division of application No. 12/254,558, filed on Oct. 20, 2008, now Pat. No. 8,159,694.

(30) Foreign Application Priority Data

Oct. 31, 2007 (JP) .................................. 2007-284074

(51) Int. Cl.
G06K 15/00 (2006.01)
H04N 1/46 (2006.01)
H04N 1/60 (2006.01)
H04N 1/405 (2006.01)

(52) U.S. Cl.
CPC ................. *H04N 1/405* (2013.01); *H04N 1/60* (2013.01); *H04N 1/4053* (2013.01)
USPC .......... 358/540; 358/3.21; 358/3.13; 345/592

(58) Field of Classification Search
USPC ...................... 358/3.06, 3.13, 3.14, 3.2, 3.21, 358/534–536; 382/180, 282, 302, 232; 345/592, 629; 715/274; 380/210, 287; 713/176; 480/460; 386/94; 399/366; 283/902; 726/26, 31
See application file for complete search history.

(56) References Cited

U.S. PATENT DOCUMENTS 5,768,410 A 6/1998 Ohta et al.
5,907,415 A 5/1999 Yabe
(Continued)

FOREIGN PATENT DOCUMENTS

JP 07-104724 A 4/1995
JP 2006-254095 A 9/2006

OTHER PUBLICATIONS

Sep. 15, 2009 Japanese Office Action and English-language translation thereof in Japanese Application No. 2007-284074.

*Primary Examiner* — Barbara Reinier
(74) *Attorney, Agent, or Firm* — Fitzpatrick, Cella, Harper & Scinto

(57) ABSTRACT

An image processor and an image processing method which can minimize variation of color tone or density in an image after screen processing, even if semi-transparency has been specified. The image processor generates semi-transparent image data by overlaying a semi-transparent object on the PDL data to be rendered semi-transparent. Subsequently, screen processing is performed on the semi-transparent image data, by dither processing. Subsequently it is determined whether or not to define the screen processed semi-transparent image data as the image data for printing. If the result of determination is No, the halftone value of the semi-transparent object is modified to be larger than the current value.

7 Claims, 25 Drawing Sheets

(56) References Cited

U.S. PATENT DOCUMENTS

| | | | |
|---|---|---|---|
| 6,023,344 A | 2/2000 | Yabe | |
| 6,348,953 B1* | 2/2002 | Rybczynski | 348/584 |
| 6,359,703 B1 | 3/2002 | Yabe | |
| 7,012,616 B1 | 3/2006 | Chatterjee | |
| 7,271,814 B2* | 9/2007 | Anwar et al. | 345/629 |
| 8,072,472 B2* | 12/2011 | Hunt | 345/660 |
| 8,243,325 B2* | 8/2012 | Eschbach | 358/1.9 |
| 2004/0130754 A1* | 7/2004 | Usui et al. | 358/3.13 |
| 2005/0034067 A1* | 2/2005 | Inoue | 715/517 |
| 2007/0070082 A1* | 3/2007 | Brennan | 345/592 |
| 2007/0109306 A1* | 5/2007 | Clark et al. | 345/501 |
| 2007/0188813 A1* | 8/2007 | Ozawa | 358/3.21 |
| 2007/0242292 A1* | 10/2007 | Kinoshita | 358/1.9 |
| 2007/0296749 A1* | 12/2007 | Mizutani et al. | 347/14 |
| 2008/0062447 A1 | 3/2008 | Bai et al. | |
| 2009/0217161 A1 | 8/2009 | Minegishi | |

* cited by examiner

| 1 | 5 | 17 | 32 | 2 | 6 | 18 | 34 | 1 | 5 | 17 | 32 | 2 | 6 | 18 | 34 |
|---|---|---|---|---|---|---|---|---|---|---|---|---|---|---|---|
| 13 | 9 | 25 | 41 | 14 | 10 | 26 | 42 | 13 | 9 | 25 | 41 | 14 | 10 | 26 | 42 |
| 21 | 29 | 45 | 49 | 22 | 30 | 46 | 50 | 21 | 29 | 45 | 49 | 22 | 30 | 46 | 50 |
| 37 | 53 | 57 | 61 | 38 | 54 | 58 | 62 | 37 | 53 | 57 | 61 | 38 | 54 | 58 | 62 |
| 4 | 8 | 20 | 36 | 3 | 7 | 19 | 35 | 4 | 8 | 20 | 36 | 3 | 7 | 19 | 35 |
| 16 | 12 | 28 | 44 | 15 | 11 | 27 | 43 | 16 | 12 | 28 | 44 | 15 | 11 | 27 | 43 |
| 24 | 32 | 48 | 52 | 23 | 31 | 47 | 51 | 24 | 32 | 48 | 52 | 23 | 31 | 47 | 51 |
| 40 | 56 | 60 | 64 | 9 | 55 | 59 | 63 | 40 | 56 | 60 | 64 | 9 | 55 | 59 | 63 |
| 1 | 5 | 17 | 32 | 2 | 6 | 18 | 34 | 1 | 5 | 17 | 32 | 2 | 6 | 18 | 34 |
| 13 | 9 | 25 | 41 | 14 | 10 | 26 | 42 | 13 | 9 | 25 | 41 | 14 | 10 | 26 | 42 |
| 21 | 29 | 45 | 49 | 22 | 30 | 46 | 50 | 21 | 29 | 45 | 49 | 22 | 30 | 46 | 50 |
| 37 | 53 | 57 | 61 | 38 | 54 | 58 | 62 | 37 | 53 | 57 | 61 | 38 | 54 | 58 | 62 |
| 4 | 8 | 20 | 36 | 3 | 7 | 19 | 35 | 4 | 8 | 20 | 36 | 3 | 7 | 19 | 35 |
| 16 | 12 | 28 | 44 | 15 | 11 | 27 | 43 | 16 | 12 | 28 | 44 | 15 | 11 | 27 | 43 |
| 24 | 32 | 48 | 52 | 23 | 31 | 47 | 51 | 24 | 32 | 48 | 52 | 23 | 31 | 47 | 51 |
| 40 | 56 | 60 | 64 | 9 | 55 | 59 | 63 | 40 | 56 | 60 | 64 | 9 | 55 | 59 | 63 |

FIG.6

| 0 | 0 | 16 | 16 | 0 | 0 | 16 | 16 | 0 | 0 | 16 | 16 | 0 | 0 | 16 |
|---|---|----|----|---|---|----|----|---|---|----|----|---|---|----|
| 0 | 0 | 16 | 16 | 0 | 0 | 16 | 16 | 0 | 0 | 16 | 16 | 0 | 0 | 16 |
| 16 | 16 | 0 | 0 | 16 | 16 | 0 | 0 | 16 | 16 | 64 | 64 | 16 | 16 | 64 |
| 16 | 16 | 0 | 0 | 16 | 16 | 0 | 0 | 16 | 16 | 64 | 64 | 16 | 16 | 64 |
| 0 | 0 | 16 | 16 | 0 | 0 | 16 | 16 | 64 | 64 | 16 | 16 | 0 | 0 | 16 |
| 0 | 0 | 16 | 16 | 0 | 0 | 16 | 16 | 64 | 64 | 16 | 16 | 0 | 0 | 16 |
| 16 | 16 | 0 | 0 | 16 | 16 | 64 | 64 | 16 | 16 | 0 | 0 | 16 | 16 | 0 |
| 16 | 16 | 0 | 0 | 16 | 16 | 64 | 64 | 16 | 16 | 0 | 0 | 16 | 16 | 0 |
| 0 | 0 | 16 | 16 | 64 | 64 | 16 | 16 | 0 | 0 | 16 | 16 | 0 | 0 | 16 |
| 0 | 0 | 16 | 16 | 64 | 64 | 16 | 16 | 0 | 0 | 16 | 16 | 0 | 0 | 16 |
| 16 | 16 | 64 | 64 | 16 | 16 | 0 | 0 | 16 | 16 | 0 | 0 | 16 | 16 | 0 |
| 16 | 16 | 64 | 64 | 16 | 16 | 0 | 0 | 16 | 16 | 0 | 0 | 16 | 16 | 0 |
| 0 | 0 | 16 | 16 | 0 | 0 | 16 | 16 | 0 | 0 | 16 | 16 | 0 | 0 | 16 |
| 0 | 0 | 16 | 16 | 0 | 0 | 16 | 16 | 0 | 0 | 16 | 16 | 0 | 0 | 16 |
| 16 | 16 | 64 | 64 | 16 | 16 | 0 | 0 | 16 | 16 | 0 | 0 | 16 | 16 | 0 |

FIG.7

| 0 | 0 | 20 | 20 | 0 | 0 | 20 | 20 | 0 | 0 | 20 | 20 | 0 | 0 | 20 |
|---|---|----|----|---|---|----|----|---|---|----|----|---|---|----|
| 0 | 0 | 20 | 20 | 0 | 0 | 20 | 20 | 0 | 0 | 20 | 20 | 0 | 0 | 20 |
| 20 | 20 | 0 | 0 | 20 | 20 | 0 | 0 | 20 | 20 | 64 | 64 | 20 | 20 | 64 |
| 20 | 20 | 0 | 0 | 20 | 20 | 0 | 0 | 20 | 20 | 64 | 64 | 20 | 20 | 64 |
| 0 | 0 | 20 | 20 | 0 | 0 | 20 | 20 | 64 | 64 | 20 | 20 | 0 | 0 | 20 |
| 0 | 0 | 20 | 20 | 0 | 0 | 20 | 20 | 64 | 64 | 20 | 20 | 0 | 0 | 20 |
| 20 | 20 | 0 | 0 | 20 | 20 | 64 | 64 | 20 | 20 | 0 | 0 | 20 | 20 | 0 |
| 20 | 20 | 0 | 0 | 20 | 20 | 64 | 64 | 20 | 20 | 0 | 0 | 20 | 20 | 0 |
| 0 | 0 | 20 | 20 | 64 | 64 | 20 | 20 | 0 | 0 | 20 | 20 | 0 | 0 | 20 |
| 0 | 0 | 20 | 20 | 64 | 64 | 20 | 20 | 0 | 0 | 20 | 20 | 0 | 0 | 20 |
| 20 | 20 | 64 | 64 | 20 | 20 | 0 | 0 | 20 | 20 | 0 | 0 | 20 | 20 | 0 |
| 20 | 20 | 64 | 64 | 20 | 20 | 0 | 0 | 20 | 20 | 0 | 0 | 20 | 20 | 0 |
| 0 | 0 | 20 | 20 | 0 | 0 | 20 | 20 | 0 | 0 | 20 | 20 | 0 | 0 | 20 |
| 0 | 0 | 20 | 20 | 0 | 0 | 20 | 20 | 0 | 0 | 20 | 20 | 0 | 0 | 20 |
| 20 | 20 | 64 | 64 | 20 | 20 | 0 | 0 | 20 | 20 | 0 | 0 | 20 | 20 | 0 |

FIG.14

| 0 | 0 | 24 | 24 | 0 | 0 | 24 | 24 | 0 | 0 | 24 | 24 | 0 | 0 | 24 |
|---|---|---|---|---|---|---|---|---|---|---|---|---|---|---|
| 0 | 0 | 24 | 24 | 0 | 0 | 24 | 24 | 0 | 0 | 24 | 24 | 0 | 0 | 24 |
| 24 | 24 | 0 | 0 | 24 | 24 | 0 | 0 | 24 | 24 | 64 | 64 | 24 | 24 | 64 |
| 24 | 24 | 0 | 0 | 24 | 24 | 0 | 0 | 24 | 24 | 64 | 64 | 24 | 24 | 64 |
| 0 | 0 | 24 | 24 | 0 | 0 | 24 | 24 | 64 | 64 | 24 | 24 | 0 | 0 | 24 |
| 0 | 0 | 24 | 24 | 0 | 0 | 24 | 24 | 64 | 64 | 24 | 24 | 0 | 0 | 24 |
| 24 | 24 | 0 | 0 | 24 | 24 | 64 | 64 | 24 | 24 | 0 | 0 | 24 | 24 | 0 |
| 24 | 24 | 0 | 0 | 24 | 24 | 64 | 64 | 24 | 24 | 0 | 0 | 24 | 24 | 0 |
| 0 | 0 | 24 | 24 | 64 | 64 | 24 | 24 | 0 | 0 | 24 | 24 | 0 | 0 | 24 |
| 0 | 0 | 24 | 24 | 64 | 64 | 24 | 24 | 0 | 0 | 24 | 24 | 0 | 0 | 24 |
| 24 | 24 | 64 | 64 | 24 | 24 | 0 | 0 | 24 | 24 | 0 | 0 | 24 | 24 | 0 |
| 24 | 24 | 64 | 64 | 24 | 24 | 0 | 0 | 24 | 24 | 0 | 0 | 24 | 24 | 0 |
| 0 | 0 | 24 | 24 | 0 | 0 | 24 | 24 | 0 | 0 | 24 | 24 | 0 | 0 | 24 |
| 0 | 0 | 24 | 24 | 0 | 0 | 24 | 24 | 0 | 0 | 24 | 24 | 0 | 0 | 24 |
| 24 | 24 | 64 | 64 | 24 | 24 | 0 | 0 | 24 | 24 | 0 | 0 | 24 | 24 | 0 |

FIG.17

APPARATUS AND METHOD DETERMINING WHETHER OBJECT SPECIFIED TO ENABLE AN UNDERLYING OBJECT TO BE SEEN THERE THROUGH IS INCLUDED IN DATA TO BE PRINTED, AND MEDIUM HAVING INSTRUCTIONS FOR PERFORMING THE METHOD

This application is a divisional of U.S. patent application Ser. No. 12/254,558, filed Oct. 20, 2008, pending.

BACKGROUND OF THE INVENTION

1. Field of the Invention

The present invention relates to an image processor and an image processing method, and more particularly, to an image processor and an image processing method for optimally processing drawing data on a personal computer or the like.

2. Description of the Related Art

Recently, languages used for a page description have made it possible to specify transparency, from applications or the OS (Operation System), as an expression of overlaid objects in such a manner that an object drawn below is transparently visible. The above-mentioned language for page description will be hereafter referred to as PDL (Page Description Language).

Specification of transparency is meant to specify that an overlying object is rendered transparent so that an underlying object can be seen through the overlying object.

However, there may be a situation that, depending on the type of PDL, transparency specification commands are not supported, although the application or the OS has specified transparency in response to the user's request. In such a case, instead of specifying transparency, the degree of filling the object may be reduced by creating a filled portion and an unfilled portion through which the underlying object can be seen. Such processing may be used in place of specifying transparency, allowing the underlying object to be seen through the overlying object. With this method, in other words, it is possible to execute a drawing command that allows the underlying object to be visible as if the overlying object has become transparent, even if the PDL does not support transparency specification.

As the specification used in this case for filling the object, a Graphic Device Interface (GDI) command, which is one of the drawing commands of Windows (registered trademark), for example, uses a pattern with reduced brush patterns. Since this object with a reduced pattern is one which is specified to be semi-transparent in the application, it will be hereafter referred to as a "semi-transparent object".

The above-mentioned related art will be described according to how a specification is made in PowerPoint, a real application provided by Microsoft Corporation. In the entire hole layout shown in FIG. 1, for example, the drawing, as shown in FIG. 2, a gray pattern as the semi-transparent object on a hole 1 bearing the reference numeral 101 may be effected as follows. The user specifies semi-transparency in the GUI 201 "autoshape format setting" shown in FIG. 2. The autoshape format setting allows a specification such that the underlying hole 1 can be seen through the gray pattern as shown in object 204, by specifying gray in the filling-color specification 202 as well as checking on the semi-transparency specification 203 to specify semi-transparency.

The object 204, i.e., the semi-transparent object of FIG. 2, is actually drawn in a manner shown in FIG. 3. In order to first create a filled portion and an unfilled portion through which the underlying object can be seen, according to the semi-transparency specification of the object, an object having a lattice pattern (semi-transparent object) 301 is drawn where the degree of filling is reduced by a certain interval. Next, an object 302 is drawn, on which the object 301 will be overlaid. Finally, the two objects 301 and 302 are overlaid, resulting in an object 303. As understandable from the result, the circle included in the object 302 is drawn in a manner such that it is visible through the gray pattern whose filling-color is specified in the filling-color specification 202, whereby semi-transparency is achieved.

For reference, an exemplary case in which semi-transparency is not specified is shown in FIG. 4. In FIG. 4, semi-transparency specification of semi-transparency specification 203 is checked out by the user specifying the autoshape format of GUI 201. Therefore, the hole 1 area of object 101 is filled in gray, masking the underlying hole 1 area to be invisible.

Additionally, the actual drawing situation in this case is shown in FIG. 5. First, an object 501 filled in gray is drawn according to a fill-in-gray specification, then an object 502 to be overlaid is drawn next. Finally, overlaying the above-mentioned two objects 501 and 502 results in an object 503 filled in gray. As can be seen from the result, since the gray color is filled on the circle included in the object 502 specified to be filled but not specified to be a semi-transparent, the circle is not visible through the object 503.

The drawing data of FIGS. 3 and 5 goes through dither processing in the intermediate process of the printer and is printed out on paper or the like. An example of binarized dither for use in dither processing in the intermediate process of the printer is shown in FIG. 6. The dither shown is an example having reduced screen ruling in order to smoothly reproduce the gradation of the graphics. In addition, for simplicity, the case of a 64-gradation with a maximum value of 64 and also of a binarized dither is described here. It is needless to say that the dither may be different, depending on the printer resolution, the number of gradations, or what base number to be used, and is not limited to the one used herein for explanation.

With each depicted numeric value of the dither corresponding to a pixel, the dither processing compares an input value and the dither value in a pixel and binarizes the pixel into black if the input value is equal to or larger than the dither value. For example, an input signal, expressing an expanded portion of the object 303 of FIG. 3, is shown in FIG. 7. FIG. 8 shows the result of binarization by applying the dither of FIG. 6 to the input signal shown in FIG. 7. As can be seen in FIG. 8, conventional dither processing eliminates the gray part of the object 303 of FIG. 3, whereby only the circle portion is printed.

FIG. 9 illustrates the result of binarizing the object 503 of FIG. 5 by applying the dither of FIG. 6 thereto. As illustrated, it may happen that the resulting binarized positions, which are originally specified to be filled in gray and thus supposed to have several dots arranged therein, have no dots arranged therein. For example, as shown in FIG. 8, the background of the circle which is supposed to have dots arranged therein has no dots at all. This is because interference occurred between the dither processing in the intermediate process of the printer and the drawing pattern specified to be semi-transparent, whereby a part which was originally supposed to be filled is not filled. Although density may vary due to monochrome print here, color tone may vary in the case of color print because a color dot which was supposed to be placed on a supposed position is not formed.

As thus described, applying dither processing to a semi-transparent object may result in the absence of dots in a region on a semi-transparent object where the dots were supposed to be formed. In other words, dither processing may prevent the expressing of the original semi-transparent object.

In addition, since intermediate processes in a printer may differ according to the type of printer, interference or moire may vary between the above-mentioned drawing pattern specified to be semi-transparent and the dither processing, resulting in varied color tone or density due to difference between machines.

Therefore, according to Japanese Patent Laid-Open No. 2006-254095, which proposes a conventional solution, a pattern cycle and a direction in the image signal are detected in the output color space, and the presence of moire is determined by the detection result and the normally used screen cycle and direction to switch screens as necessary. In other words, Japanese Patent Laid-Open No. 2006-254095 proposes a method that determines the part where moire due to interference is likely to appear by translating the PDL and frequency-analyzing each pixel of the resulting bit map data, and modifies the screen processing of that part to a high-frequency screen such as error diffusion processing.

However, with the method described in Japanese Patent Laid-Open No. 2006-254095, although a screen specification with a low-frequency and low screen ruling has been made in order to smoothly reproduce an object specified to be filled in a uniform color, a grid pattern may be detected due to the semi-transparency specification, and screen processing may be changed to error diffusion processing in order to prevent the occurrence of moire. Such a change to error diffusion processing may raise the frequency and degrade the stability of the screen, which may result in increased roughness. In other words, the reduced screen ruling, originally chosen with the purpose of smoothly reproducing the object in a uniform color or gradation, is modified to high screen ruling, causing roughness against the intention of the designer and the user. In addition, executing by software the complicated frequency analysis processing for each and every pixel is time-consuming, whereas execution by hardware requires enormously large scale hardware. Furthermore, there was no way of preliminarily checking how the image would look like until it is printed out.

SUMMARY OF THE INVENTION

It is an object of the present invention, conceived in view of the above problems, to provide an image processor and an image processing method which can minimize the variation of color tone or density in the images after screen processing, even if semi-transparency has been specified.

According to a first aspect of the present invention, there is provided an image processor which comprises, a determination unit for determining whether or not a semi-transparent object is included in an image to be printed, and a control unit for controlling the processor so that the result of dither processing on the image to be printed is displayed on a display screen if it is determined by the determination unit that a semi-transparent object is included, and controlling the processor so that the result of dither processing on the image to be printed is not displayed on a display screen if it is determined by the determination unit that a semi-transparent object is not included.

According to a second aspect of the present invention, there is provided an image processor which comprises, a dither processing unit for executing dither processing on a semi-transparent object, an acquisition unit for acquiring the difference between the density of the image obtained by the dither processing and the density of the semi-transparent object, and a modification unit for modifying the halftone value of the semi-transparent object if the difference acquired by the acquisition unit exceeds a threshold value.

According to a third aspect of the present invention, there is provided an image processor which comprises, a determination unit for determining whether or not an image with periodically varying density is included in the image to be printed, and a control unit for controlling the processor so that the result of dither processing on the image to be printed is displayed on a display screen if it is determined by the determination unit that an image with periodically varying density is included, and controlling the processor so that the result of dither processing on the image to be printed is not displayed on a display screen if it is determined by the determination unit that an image with periodically varying density is not included.

According to a fourth aspect of the present invention, there is provided an image processor which comprises, a generation unit for generating image data having a semi-transparent object overlaid thereon by overlaying a semi-transparent object on the image data, an execution unit for executing screen processing by dither processing on the image data having the semi-transparent object overlaid thereon, a determination unit for determining whether or not to define the screen processed image data having a semi-transparent object overlaid thereon as image data for printing, and a modification unit for modifying the halftone value of the semi-transparent object to be larger than the current value if the determination unit determines not to define the image data having a semi-transparent object overlaid thereon as image data for printing, wherein if the halftone value is modified by the modification unit, the generation unit generates image data having the semi-transparent object overlaid thereon by overlaying on the image data a semi-transparent object whose halftone value has been modified.

According to a fifth aspect of the present invention, there is provided an image processor which comprises, a dither processing unit for executing dither processing on a semi-transparent object whose halftone value has been set, a calculation unit for calculating the difference between the density of the semi-transparent object after the dither processing and the density of the semi-transparent object before the dither processing, an input unit for setting higher the halftone value of the semi-transparent object and inputting the semi-transparent object into the dither processing unit again, if the difference is larger than or equal to a threshold value, and an output unit for outputting the dither-processed semi-transparent object, if the difference is smaller than the threshold value.

According to a sixth aspect of the present invention, there is provided an image processor which comprises, a dither processing unit for executing dither processing on a semi-transparent object whose halftone value has been set, a calculation unit for calculating the difference between the density of the semi-transparent object after the dither processing and the density of the semi-transparent object before the dither processing, an input unit for setting higher the halftone value of the semi-transparent object and inputting the semi-transparent object into the dither processing unit again, if the difference is larger than or equal to a threshold value, and an output unit for outputting the semi-transparent object before the dither processing, if the difference is smaller than the threshold value, wherein the semi-transparent object which has been output by the output unit is dither processed in the output destination.

According to a seventh aspect of the present invention, there is provided an image processing method which comprises, a determination process for determining whether or not a semi-transparent object is included in an image to be printed, and a control process for controlling the method so that a result of dither processing on the image to be printed is displayed on a display screen if it is determined by the determination process that a semi-transparent object is included, and controlling the method so that a result of dither processing on the image to be printed is not displayed on a display screen if it is determined by the determination process that a semi-transparent object is not included.

According to a eighth aspect of the present invention, there is provided a computer program for causing a computer to execute the image processing method according to the seventh aspect.

According to a ninth aspect of the present invention, there is provided a storage medium having a computer readable program stored therein and having the computer program according to the eighth aspect stored therein.

According to the present invention, it is possible to minimize the variation of the color tone or density by modifying the halftone value of the halftone pattern of a semi-transparent object. Additionally, by not changing the screen processing, it is possible to enhance reproducibility of a semi-transparent object without defying the intention of the designer and the user whose original purpose has been to smoothly reproduce the object in a uniform color and gradation. Furthermore, because only the density of the semi-transparent object needs to be adjusted without requiring any advanced processing such as conventional frequency analysis, processing by software is not time-consuming and a simple circuit can be used when processing by hardware without enlarging the hardware scale.

Further features of the present invention will become apparent from the following description of exemplary embodiments (with reference to the attached drawings).

BRIEF DESCRIPTION OF THE DRAWINGS

FIG. 6 illustrates an example of a binarized dither for use in dither processing in the intermediate process of an image forming device such as a printer, according to prior art;

FIG. 7 illustrates an input signal expressing an expanded portion of the object 303 of FIG. 3;

FIG. 14 illustrates semi-transparent image data after the halftone value of the semi-transparent object according to an embodiment of the present invention has been converted;

FIG. 17 illustrates semi-transparent image data after the halftone value of the semi-transparent object according to an embodiment of the present invention has been converted;

DESCRIPTION OF THE EMBODIMENTS

Figure 1:
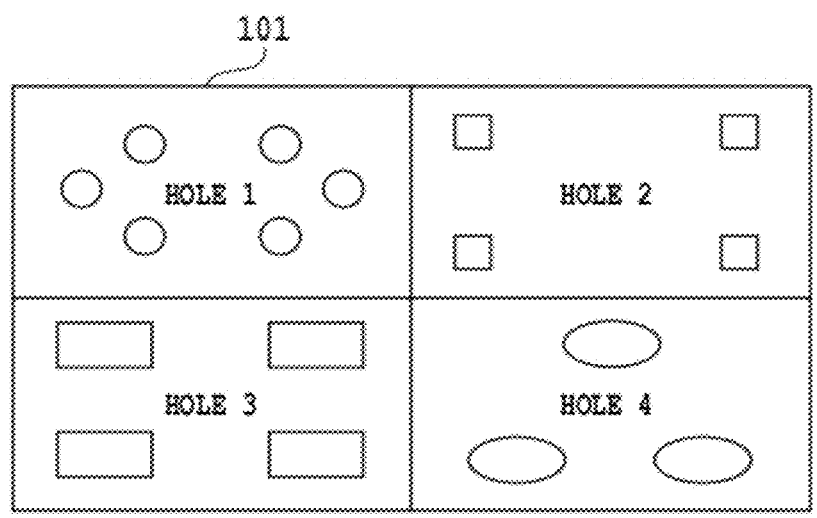
FIG. 1 illustrates an object which can be specified to be semi-transparent, according to prior art.

In the following, embodiments of the present invention will be described in detail referring to the drawings. In the drawings described below, identical reference numerals are assigned to elements having identical functions and duplicate description is omitted thereof FIG. 25 is a block diagram illustrating the general structure of the control system in the image processor according to an embodiment of the present invention.

Figure 25:
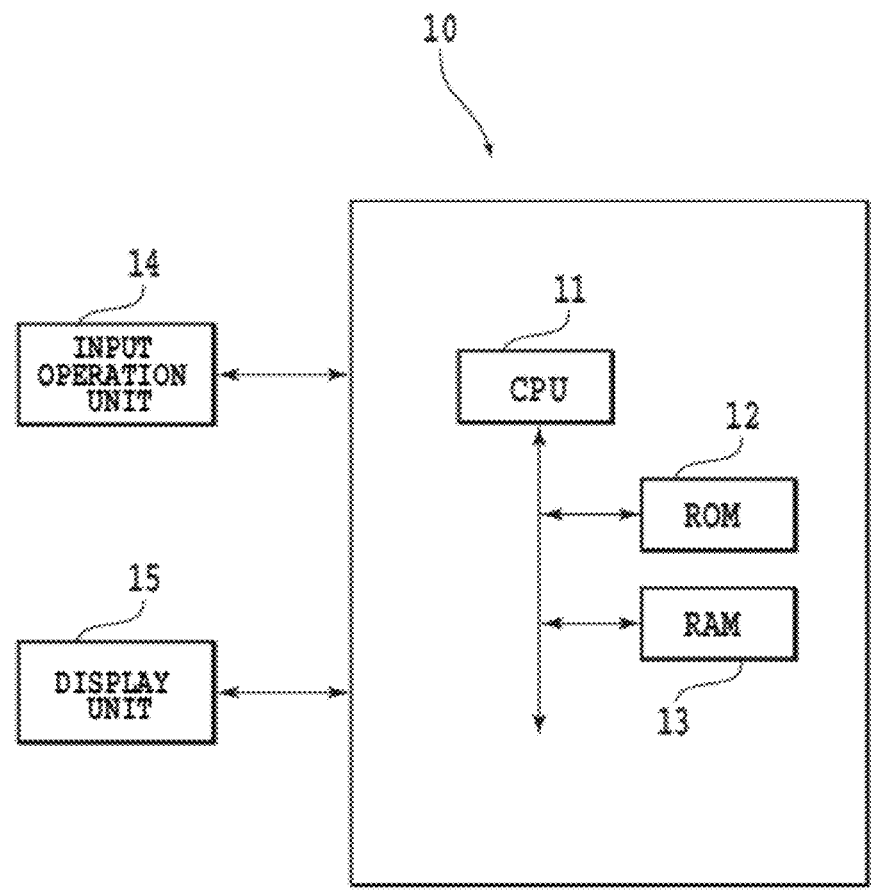
FIG. 25 is block diagram illustrating a general arrangement of the control system included in the image processor in an embodiment of the present invention.

In FIG. 25, the controller 10 is a control unit for controlling the entire image processor. The controller 10 comprises a CPU 11 for executing a variety of processing functions such as operations, controls, differentiations, or the like. In addition, the controller 10 comprises a ROM 12 for storing control programs of processes to be executed by the CPU 11, which will be described below referring to FIGS. 10, 19-21, and a RAM 13 for temporarily storing the data being processed and the input data of the CPU 11.

The controller 10 has connected thereto an input operation unit 14 including a keyboard or a variety of switches for inputting predefined commands or data, and a display unit 15 for displaying a variety of information, such as the input or the setting status of the image processor.

Figure 2:
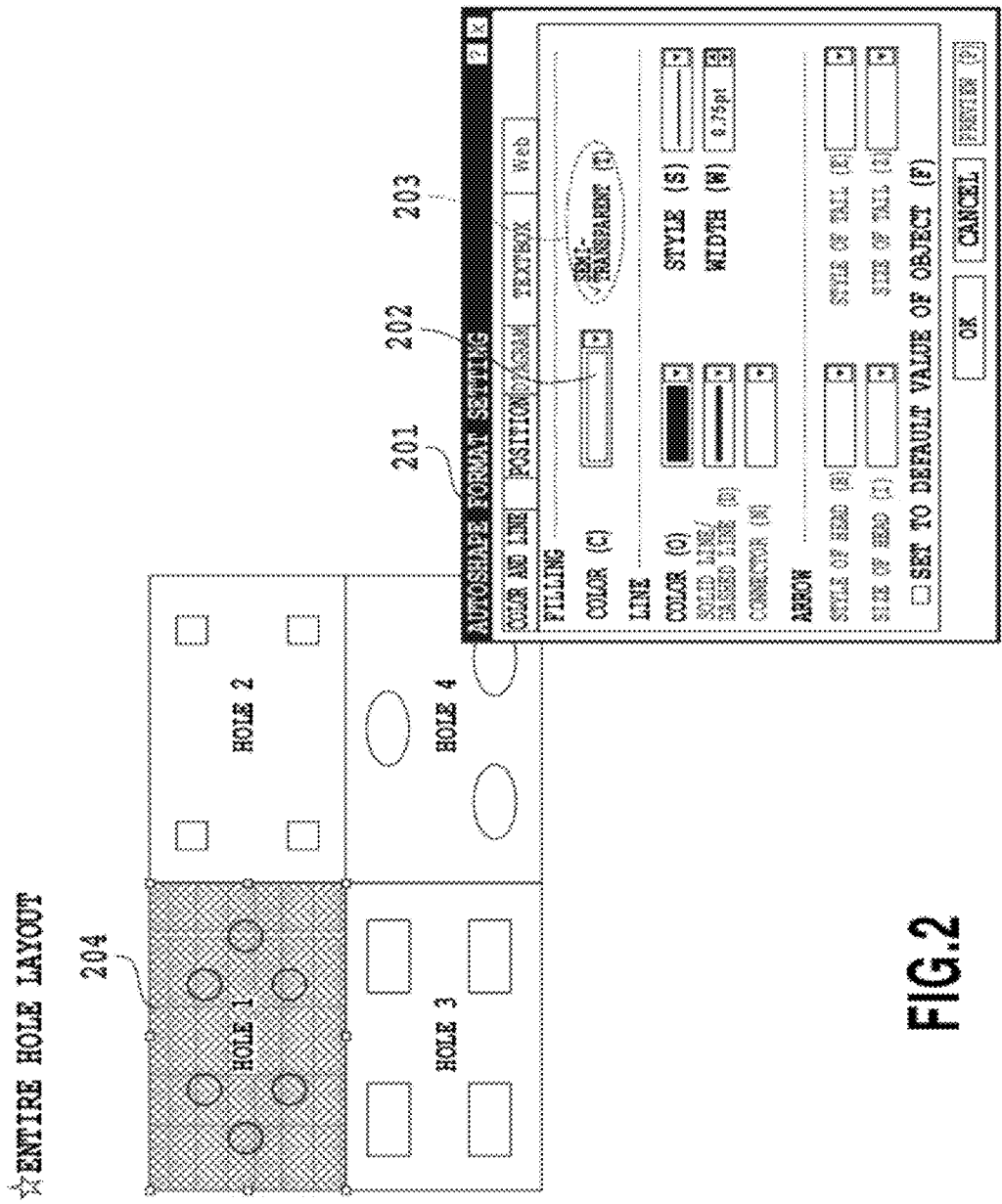
FIG. 2 is an explanatory illustration of a method of specifying semi-transparency in a predefined application, according to prior art.

The image processor can display a GUI 201 shown in FIG. 2 on the display unit 15. When specifying semi-transparency in a variety of applications, the user performs a predefined operation for the filling-color specification 202 and the semi-transparency specification 203, which are included in the GUI 201, by operating the input operation unit 14. If semi-transparency is specified by the user via the input operation unit 14, the image processor overlays a semi-transparent object (object 301 in FIG. 3) on the image data to be rendered semi-transparent (object 302 in FIG. 3), whereby image data for printing is provided. Thus, in the present specification, image data having a semi-transparent object overlaid thereon will be referred to as "semi-transparent image data".

Here, in an embodiment of the present invention, the image processor may acquire image data using any method. For example, the user may operate the input operation unit 14 and create the data on a predefined application. Additionally, if a reader of a removable medium such as a magnetic disk or an optical disk is provided, image data may be input via the removable medium. Furthermore, if an image reading device such as a scanner is built-in or connected via a network, the image data may be acquired by inputting the image data which has been read by the above-mentioned image reading device.

Additionally, in an embodiment of the present invention, the image processor reads out a program from the ROM 12 and creates image data (PDL data) for printing by executing a processing described below referring to FIGS. 10, and 19-21. Then the created image data for printing is transmitted to an image forming device such as a printer. The image forming device executes printing, based on the transmitted image data for printing. The image forming device may either be integrated with the image processor or provided separately via a network or the like.

(First Embodiment)

Figure 10:
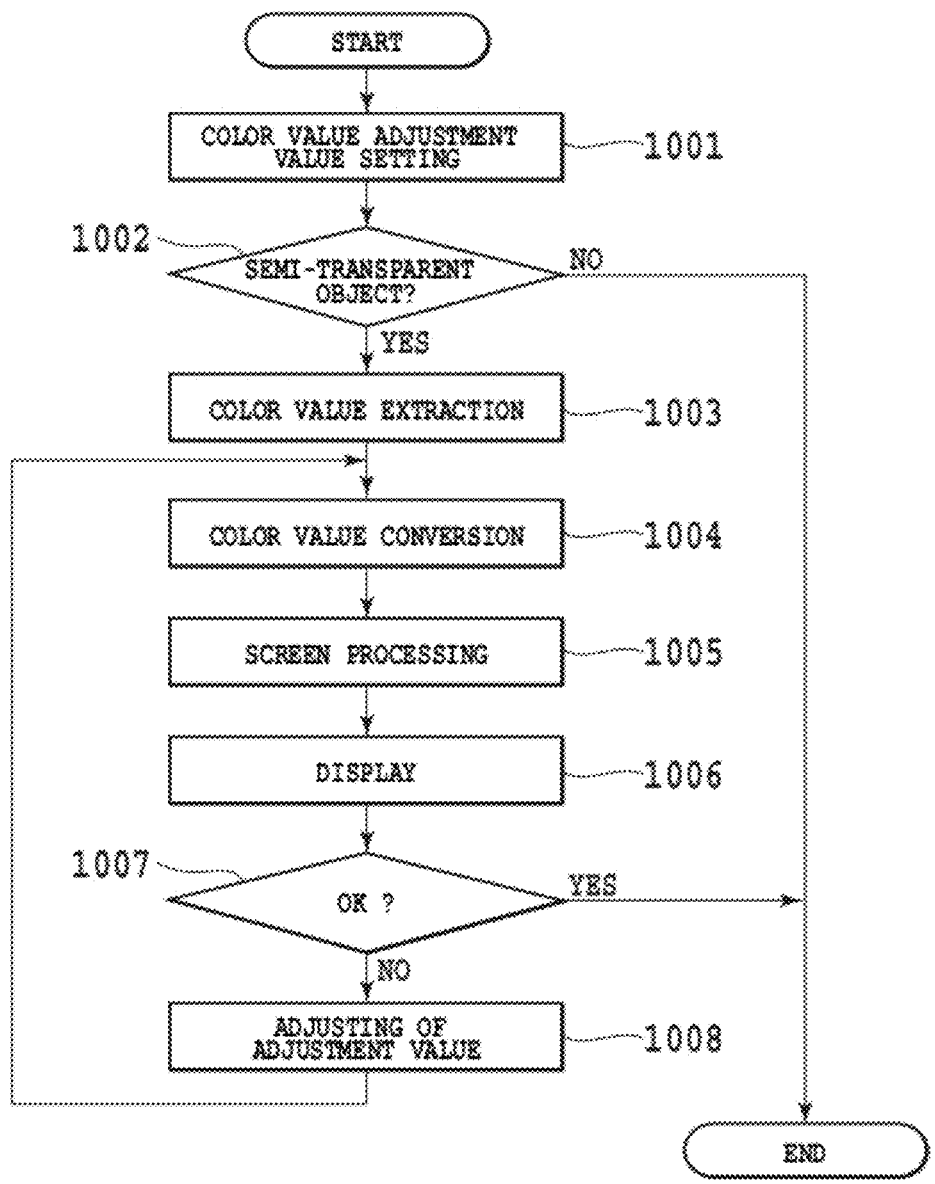
FIG. 10 is a flow chart illustrating the procedure of creating image data for printing according to an embodiment of the present invention.

The procedure of creating image data for printing according to present embodiment will be described using the flow chart of FIG. 10. Here, for simplicity, the case of monochromatic images will be described in the present embodiment.

First, in a predefined application included in the image processor, the user specifies, via the input operation unit 14, an image to be printed among the images displayed on the display unit 15. Based on the specification, the CPU 11 acquires PDL data of the specified image using a known method.

In this case, the user can specify the semi-transparency format using the GUI 201 shown in FIG. 2. If, for example, the user specifies semi-transparency by the filling-color specification 202 and the semi-transparency specification 203, the CPU 11 defines the PDL data of the image specified above as the PDL data to be rendered semi-transparent. The CPU 11 also reads out a semi-transparent object (PDL data) which is a predefined filling pattern such as a lattice-like pattern, preliminarily stored in the ROM 12.

Specifically, upon receiving a command from the user to create image data for printing, the CPU 11 stores the PDL data of the specified image in the RAM 13 as the PDL data to be defined as image data for printing and proceeds to step 1001, if semi-transparent has not been specified by the GUI 201 or the like. On the other hand, if semi-transparency has been specified by the GUI 201 or the like, the CPU 11 defines the PDL data of the specified image as the PDL data to be rendered semi-transparent, acquires a semi-transparent object from the ROM 12, and stores the two data in the RAM 13. Then, the CPU 11 defines the PDL data to be rendered semi-transparent and the semi-transparent object as the PDL data to be defined as image data for printing, and proceeds to step 1001.

In step 1001, the CPU 11 executes halftone value setting (adjusted color value setting). In this setting, the value is set using the pattern density adjustment bar 1101 shown in FIG. 11. In other words, the CPU 11 determines the value which has been set in the pattern density adjustment bar 1101 as the initial value of the adjusted color value, and stores the initial value of the determined adjusted color value in the RAM 13. The adjusted color value corresponds to the halftone value of the semi-transparent object with a predefined ratio. Therefore, modification of the adjusted color value modifies the halftone value, according to the modification. Here, the middle of the pattern density adjustment bar 1101 in FIG. 11 indicates the unadjusted state.

Here, in a semi-transparent object, ON pixels and OFF pixels coexist in the object. The existence ratio of ON pixels and OFF pixels depends on the type of semi-transparent object.

For example, if the type of semi-transparent object is A, the existence ratio of ON pixels is 80%, whereas the existence ratio of OFF pixels is 20%. If, alternatively, the type of semi-transparent object is B, existence ratio of ON pixels is 60%, whereas the existence ratio of OFF pixels is 40%. The existence ratio of ON pixels and existence ratio of OFF pixels are constant as long as the type of semi-transparent object remains the same.

For example, in the present invention, although color value adjustment is executed in S1905 as will be described below, the ratio of ON pixels and ratio of OFF pixels does not change because the type of semi-transparent object is not modified in S1905, even if this color value adjustment is executed.

Here, an OFF pixel refers to a transparent pixel (unfilled pixel).

On the other hand, an ON pixel refers to a non-transparent pixel (filled pixel).

Additionally, the degree of darkness of the ON pixel is expressed by a value called a halftone value.

The shipment of an image processor may be made with the initial state staying in the middle, or unadjusted, so that it is possible to preliminarily set the adjustment according to the user's preference. In other words, the user may preliminarily set a desired value on the pattern density adjustment bar 1101 using the input operation unit 14 and let the CPU 11 determine the initial value of the adjusted color value according to the setting. As thus described, step 1001 may be skipped when the initial value of the adjusted color value has been preliminarily set.

Next, in step 1002, the CPU 11 analyzes the PDL data to be defined as image data for printing with regard to whether or not a semi-transparent object is included in the PDL data (image data) created by an application as shown in FIG. 2.

In the present embodiment, when specifying the semi-transparency format, semi-transparent image data is not yet created at this point, which will be created by overlaying the PDL data to be rendered semi-transparent and the semi-transparent object. However, because these two sets of data will be later overlaid and turned into the semi-transparent image data (image data for printing), they will turn into the PDL data to be defined as image data for printing.

Figure 3:
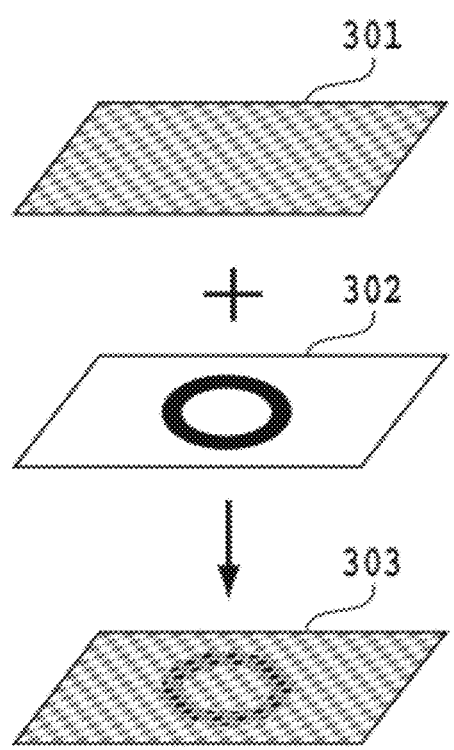
FIG. 3 illustrates how an object specified to be semi-transparent is formed when semi-transparency is specified.
Figure 4:
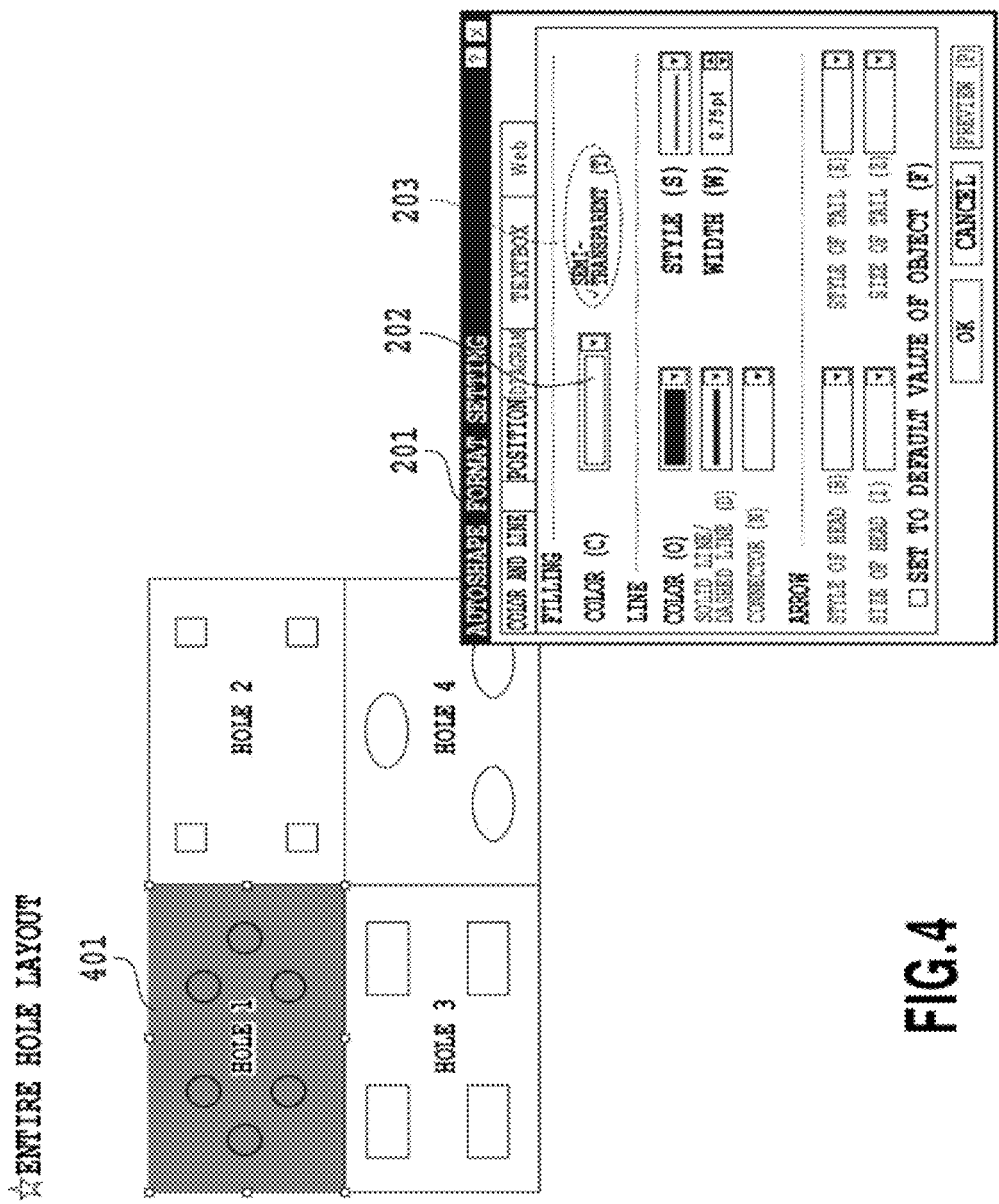
FIG. 4 is an explanatory illustration of filling an object when semi-transparency is not specified in a predefined application, according to prior art.
Figure 5:
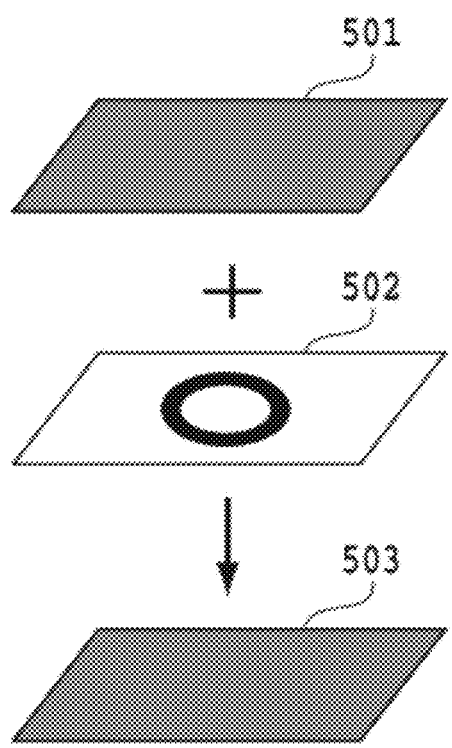
FIG. 5 illustrates how a filled object is formed when semi-transparency is not specified, according to prior art.

As a specific processing of step 1002, the CPU 11 extracts the semi-transparent object of the object 301 shown in FIG. 3, for example. In other words, the CPU 11 determines whether or not a semi-transparent object is included in the PDL data to be defined as image data for printing, the PDL data being stored in the RAM 13, and if included, determines that the image data which is about to be printed has been specified to be semi-transparent. Then, the CPU 11 acquires a semi-transparent object from the RAM 13, and detects the halftone pattern of the semi-transparent object.

If, on the other hand, a semi-transparent object is not included in the PDL data to be defined as image data for printing, the CPU 11 determines that semi-transparency has not been specified and defines, as image data for printing, the PDL data which is supposed to be defined as image data for printing, then simply terminates the processing.

When a semi-transparent object is detected, the CPU 11 extracts, in step 1003, the color value (halftone value) for filling the semi-transparent object. For the object 301 of FIG. 3, for example, the halftone value is 16 as shown in FIG. 7.

Next, in step 1004, the CPU 11 converts the color value (halftone value) of the current semi-transparent object so that it turns into an intermediate adjustment value corresponding to the initial value of the adjusted color value, which is the pattern density adjustment value that has been set in step 1001. Here, in the case where the process is continuing from step 1008, as will be described below, the color value of the current semi-transparent object will be converted so that it turns into an intermediate adjustment value corresponding to the color value adjusted in step 1008. If this step is continuing from step 1003, the halftone value of the current semi-transparent object is the halftone value acquired in step 1003. Alternatively, if this step is continuing from step 1008, it is the halftone value of the semi-transparent object before screen processing, the object being stored in the RAM 13. In other words, the CPU 11 converts, according to the adjusted color value acquired in step 1001 or 1008, the color value from the input color value into the output color value, using a conversion table shown in FIG. 12. Here, because a processing subsequent to step 1003 is described, a table bearing the reference numeral 1201 is first set to the initial value of the adjusted color value which has been set in step 1001, and the input value 16 is simply output as being 16. In this manner, the halftone value of the semi-transparent object is converted into the output value, whereby the halftone value of the semi-transparent object before screen processing is acquired.

The CPU 11 generates semi-transparent image data shown in FIG. 7 by overlaying, as shown in FIG. 3, the semi-transparent object whose halftone value has been converted on the PDL data to be rendered semi-transparent. The CPU 11 then extracts, from the RAM 13, the semi-transparent object and the PDL data to be rendered semi-transparent to generate semi-transparent image data. In this case, the semi-transparent object and the PDL data to be rendered semi-transparent are not deleted from the RAM 13 and remain in the RAM 13. In other words, the semi-transparent image data is generated, with the semi-transparent object whose halftone value has been converted and the PDL data to be rendered semi-transparent being preserved in the RAM 13.

As thus described, it is possible to render the desired image for output semi-transparent by preserving the semi-transparent object whose halftone value has been converted and the PDL data to be rendered semi-transparent in the RAM 13, even if the image is determined unacceptable, i.e., not OK in step 1007 described below. In other words, it is possible to create semi-transparent image data using a semi-transparent object whose halftone value has been modified, even if the image is determined not-OK as described above and the halftone value is modified.

In the present embodiment, as will be described below, it is important to create semi-transparent image data for each halftone value which has been adjusted (modified) and determine whether or not the semi-transparent image data is acceptable and, if not, adjust the halftone value again. In other words, it is necessary to create semi-transparent image data every time the halftone valued is adjusted. Therefore, in order to create semi-transparent image data for each of the above-mentioned adjustment, it is necessary to preserve, at least during the processing, the PDL data to be rendered semi-transparent which will be the base of the semi-transparent image data.

Here, a semi-transparent object remaining in the RAM 13 will be referred to as "semi-transparent object before screen processing". Once the semi-transparent object before screen processing is generated, it will not be deleted at least from the RAM 13 until the generated semi-transparent image data is considered acceptable, i.e., OK, and it turns into image data for printing. This is because it turns into the original semi-transparent object for creating the semi-transparent object of the halftone value corresponding to the adjusted color value which will be set in step 1008 described below.

Next, in step 1005, the CPU 11 executes screen processing on the generated semi-transparent image data by dither processing provided in the image processor. The screen processing is executed via binarization using the dither shown in FIG. 6, for example. Since binarization has already been described in the conventional example, a detailed description thereof will be omitted here. The result of binarization turns out to be the data shown in FIG. 8, and the CPU 11 displays the data (semi-transparent image data after screen processing) on the display unit 15 (step 1006).

Figure 11:
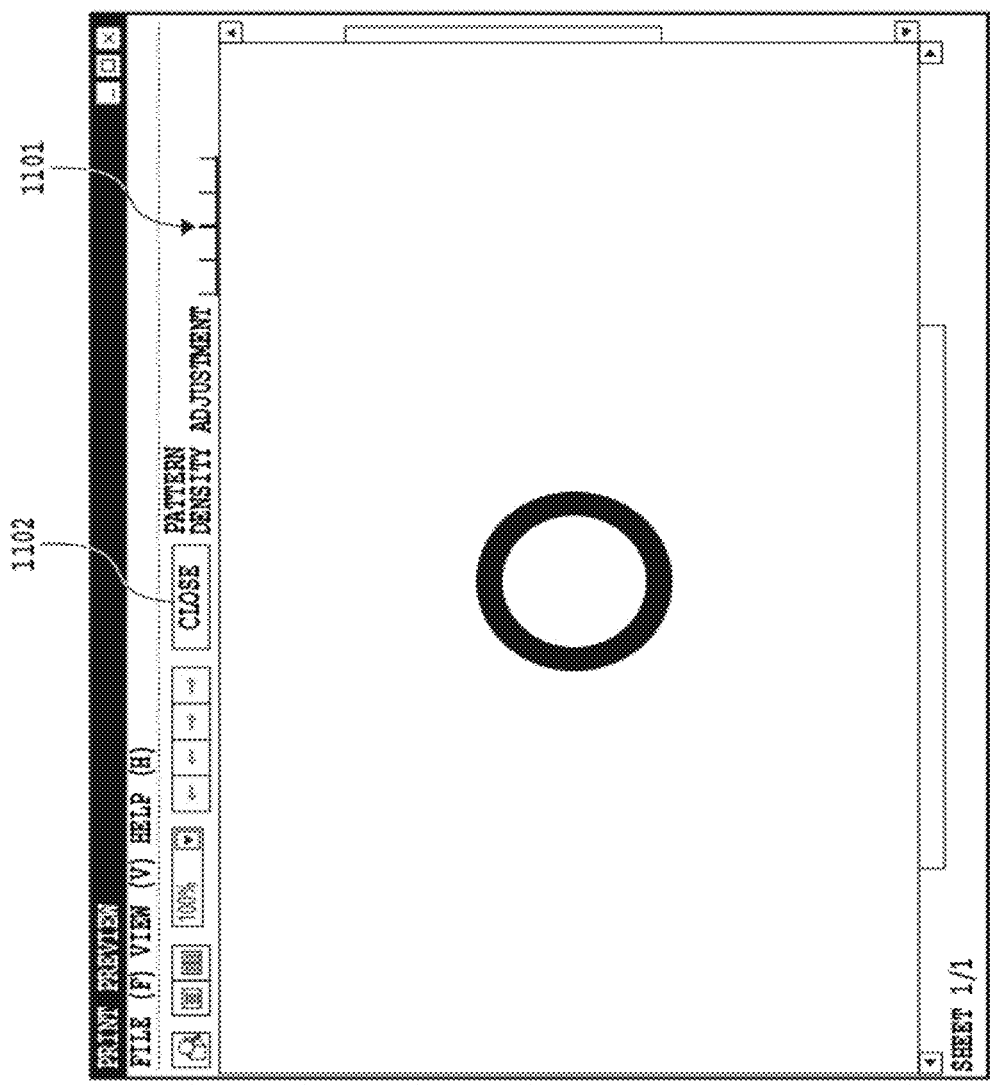
FIG. 11 illustrates an exemplary view displayed on the display unit according to an embodiment of the present invention.

The image displayed on the display unit 15 is like one shown in FIG. 11, for example. As can be seen from FIG. 11, in the part which was originally supposed to look like the object 303 of FIG. 3, the background gray color of the circle has disappeared. Then the user compares it with the original image (image specified by the user) and examines whether or not it is acceptable, i.e., OK. In response to the user's verification, the CPU 11 determines whether or not the present result is OK (step 1007). If unacceptable, i.e., not OK (the case of No), upon the user's inputting the determination result (user's input with regard to the image data displayed on the display unit 15) via the input operation unit 14, the CPU 11 proceeds to step 1008 according to the input. In this manner, the CPU 11 receives the user's input with regard to the image data displayed on the display unit 15. If Yes, the user presses the close button 1102 by operating the input operation unit 14. In response to the pressing of the button, the CPU 11 stops displaying on the display unit 15 as shown FIG. 11 and terminates the processing. Therefore, in this case, the semi-transparent image data shown in FIG. 11 turns into image data for printing.

In the present embodiment, the CPU 11 thus determines whether or not to define the semi-transparent image data which has been screen processed as image data for printing.

In the present embodiment, since the result of screen processing is presented to the user as thus described, the user can verify before printing that the desired semi-transparency is realized. If the user is not satisfied with the presented result, the user can further require an adjustment processing of the semi-transparent object and preview the screen processing on the processing result, whereby a high-quality semi-transparency that satisfies the user can be realized.

Additionally, depending on the use, the user may be satisfied even if high-quality semi-transparency has not been realized. According to the present embodiment, since the user can verify the result of screen processing before printing every time the halftone value of the semi-transparent object is converted, semi-transparency with a quality that matches the user's request can be realized. Therefore, it can cope with situations in which faster processing is required in exchange for a somewhat lower semi-transparency quality, thereby enhancing the user's convenience.

Figure 13:
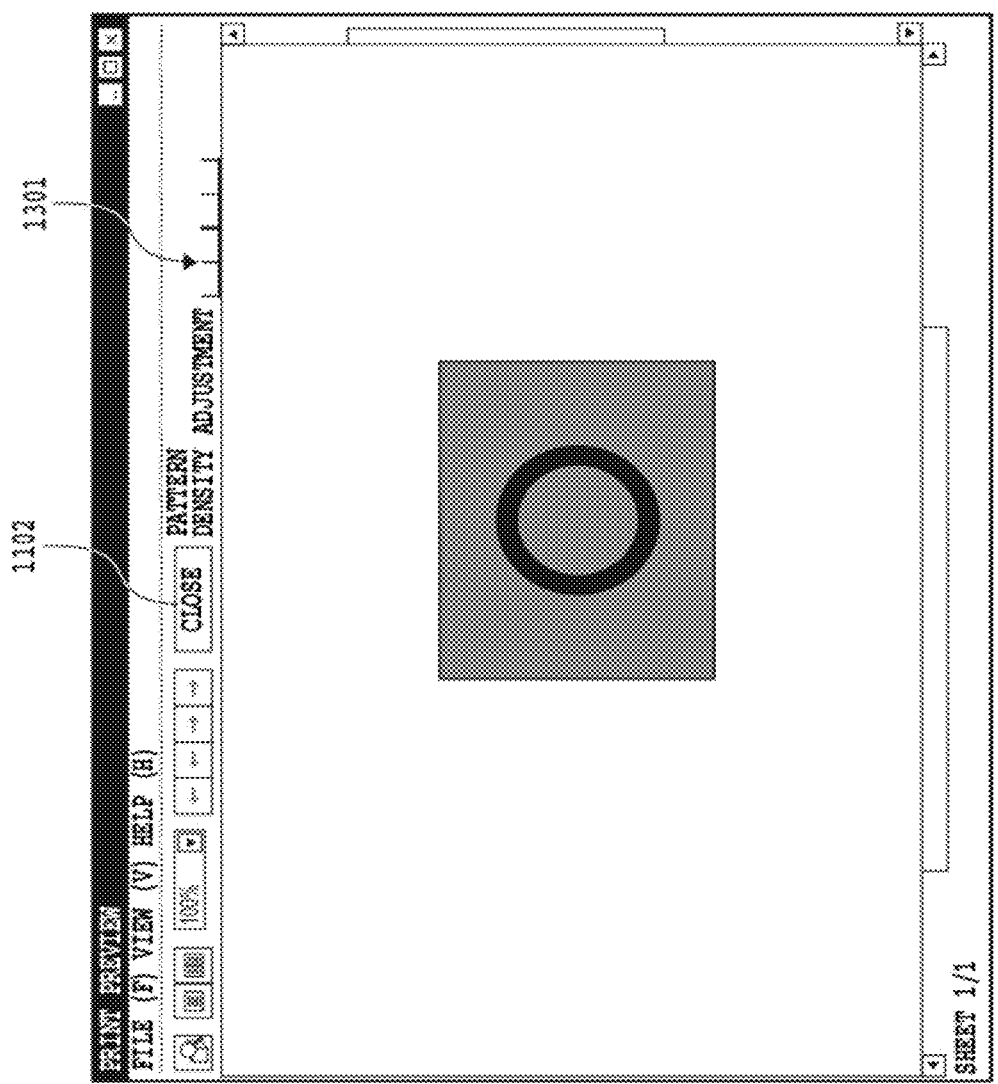
FIG. 13 illustrates an exemplary view displayed on the display unit according to an embodiment of the present invention.

If the displayed image is different from the original image and unacceptable, i.e., No, the CPU 11 adjusts, in step 1008, the adjusted color value of the semi-transparent object which has been used for the generated semi-transparent image data. For example, the user operates the pattern density adjustment bar 1101 using the input operation unit 14 and deepens the default density adjustment of FIG. 11 by one level such as the value 1301 of FIG. 13. When such a modification of the adjusted color value is instructed by the user, the CPU 11 acquires the adjusted color value corresponding to the user's input.

Figure 12:
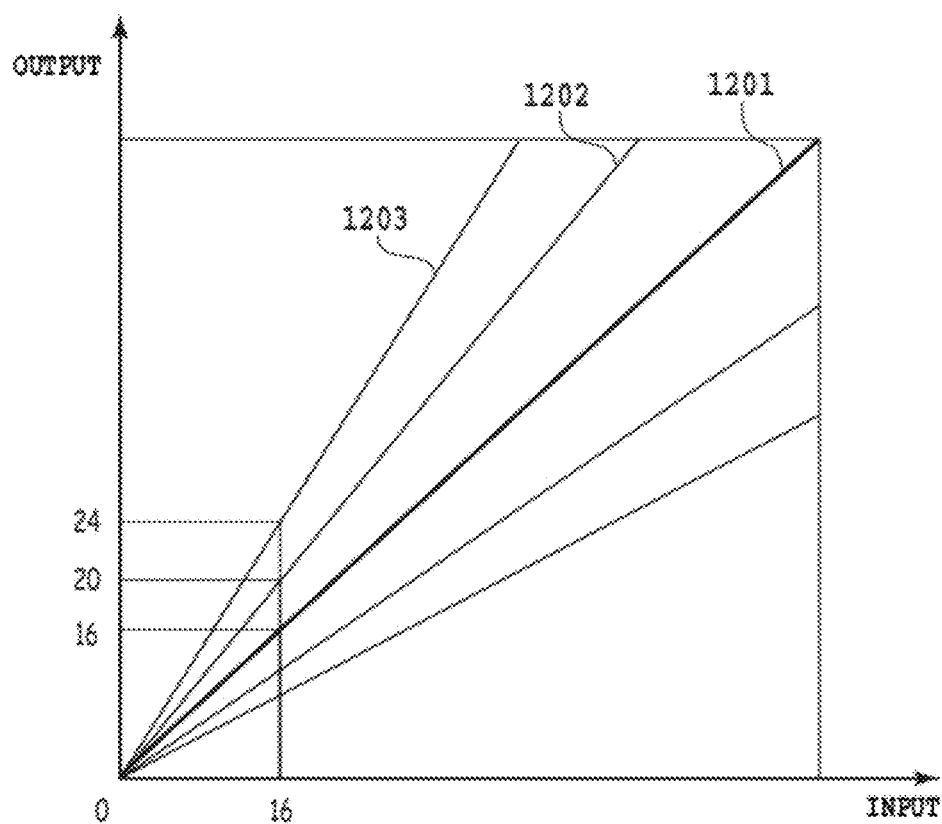
FIG. 12 is an explanatory illustration of a table for use in the color value conversion according to an embodiment of the present invention.

Subsequently, in step 1004 again, the CPU 11 converts the color value (halftone value) of the semi-transparent object stored in the RAM 13 before screen processing so that it turns into a halftone value corresponding to the adjusted color value acquired in step S1008. In such a color value conversion, a table bearing the reference numeral 1202 in FIG. 12 is applied, according to the adjusted color value which has been set deeper (set to be +1) by the user. Then, the halftone value 16 of the semi-transparent object stored in the RAM 13 before screen processing, which is the input value of the table 1202, is converted to 20. Therefore, the CPU 11 converts (adjusts) the halftone value of the semi-transparent object stored in the RAM 13 before screen processing from 16 to 20. The halftone value 20 will be the halftone value of the semi-transparent object before screen processing. At this point, the semi-transparent object before screen processing is still stored in the RAM 13.

The CPU 11 generates semi-transparent image data, based on the semi-transparent object whose halftone value has been converted and the PDL data to be rendered semi-transparent stored in the RAM 13. The generated semi-transparent image data looks like that shown in FIG. 14. It is needless to say that, in this case, the semi-transparent object before screen processing and the PDL data to be rendered semi-transparent are stored in the RAM 13.

Next, in step 1005, the CPU 11 executes screen processing by binarizing the semi-transparent image data shown in FIG. 14 using the dither shown in FIG. 6. The result of binarization turns into the data shown in FIG. 15, and the CPU 11 displays the data on the display unit 15 (step 1006). In this case, the image displayed on the display unit 15 looks like that shown in FIG. 13, for example, as a result of density adjustment.

Subsequently, in step 1007, the user compares the displayed image with the original image to verify that it is acceptable, i.e., OK. The CPU 11 receives the verification result via the input operation unit 14 and determines, based on the received result, whether or not the current result is OK.

Figure 16:
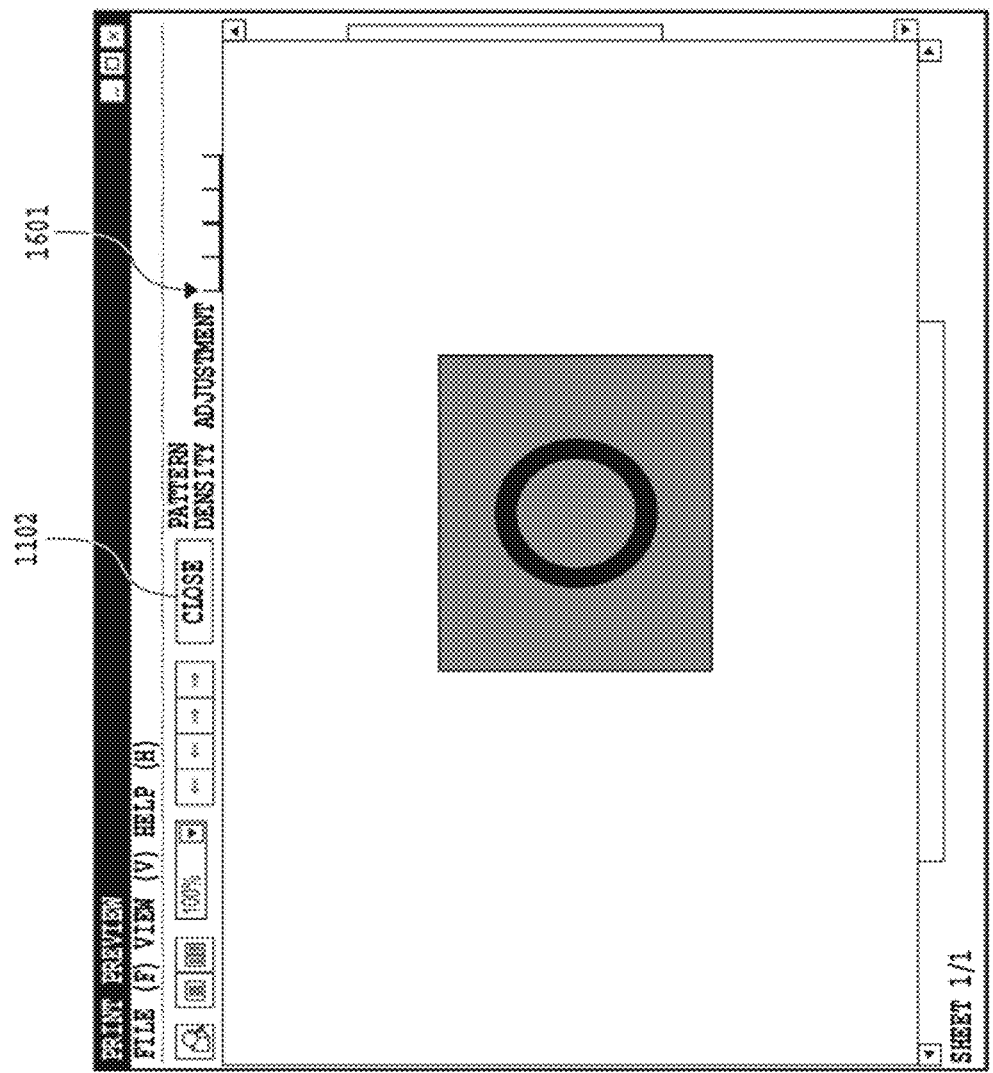
FIG. 16 illustrates an exemplary view displayed on the display unit according to an embodiment of the present invention.

Also in this case, if the displayed image is not as close to the density of the background of the circle as the original image and thus unacceptable, i.e., No, the CPU 11 proceeds to step 1008 and adjusts the adjusted color value. For example, the user operates the pattern density adjustment bar 1101 using the input operation unit 14 and deepens the density adjustment which is +1 in FIG. 13 by one level to be +2 such as the value 1601 of FIG. 16. When such a modification of the adjusted color value is instructed by the user, the CPU 11 acquires the adjusted color value corresponding to the user's input.

Subsequently, in step 1004 again, the CPU 11 converts the color value (halftone value) based on the adjusted color value acquired in step S1008. In such a color value conversion, a table bearing the reference numeral 1203 in FIG. 12 is applied, according to the adjusted color value which has been set deeper (set to be +2) by the user. Then, the halftone value 16 of the semi-transparent object stored in the RAM 13 before screen processing, which is the input value of the table 1203, is converted to 24. Therefore, the CPU 11 converts (adjusts) the halftone value of the semi-transparent object stored in the RAM 13 before screen processing from 20 to 24. The halftone value 240 will be the halftone value of the semi-transparent object before screen processing. At this point, the semi-transparent object before screen processing is still stored in the RAM 13.

The CPU 11 generates semi-transparent image data, based on the semi-transparent object whose halftone value has been converted and the PDL data to be rendered semi-transparent stored in the RAM 13. The generated semi-transparent image data looks like that shown in FIG. 17. It is needless to say that, in this case, the semi-transparent object before screen processing and the PDL data to be rendered semi-transparent are stored in the RAM 13.

Next, in step 1005, the CPU 11 executes screen processing by binarizing the semi-transparent image data shown in FIG. 17 using the dither shown in FIG. 6. The result of binarization turns into the data shown in FIG. 18, and the CPU 11 displays the data on the display unit 15 (step 1006). In this case, the image displayed on the display unit 15 looks like that shown in FIG. 16, for example, as a result of density adjustment.

In step 1007, the user compares the displayed image with the original image to verify that it is acceptable, i.e., OK. The CPU 11 receives the verification result via the input operation unit 14 and determines, based on the received result, whether or not the current result is OK. With the image shown in FIG. 16, since the gray part of the background of the circle becomes visible like the object 303 of FIG. 3, that is OK and Yes, the user presses the close button 1102 by operating the input operation unit 14 to terminate the print preview, then terminates the processing and proceeds to printing. Therefore, in this case, the semi-transparent image data shown in FIG. 16 turns into image data for printing.

As thus described, processes from generating semi-transparent image data to adjusting the color value are repeated until it is determined to define the screen processed semi-transparent image data as image data for printing.

In the present embodiment, as thus described, it becomes possible to output an image with a density close to the original by simply modifying the density of halftone pattern (halftone value) of the semi-transparent object as desired. Additionally, since the dither of the screen processing is not modified, it is possible to simply apply a dither representing the intention of the designer or the user who is attempting, as the original purpose, to smoothly reproduce the image in a uniform color or gradation, and reproduce the image without degrading the reproducibility of the semi-transparent object. Furthermore, because only the density of the semi-transparent object needs to be adjusted using a simple conversion such as that shown in FIG. 12 without requiring any advanced processing such as conventional frequency analysis, processing by software is not time-consuming, and when processing by hardware, a simple circuit can be used without scaling-up the hardware.

(Second Embodiment)

Figure 19:
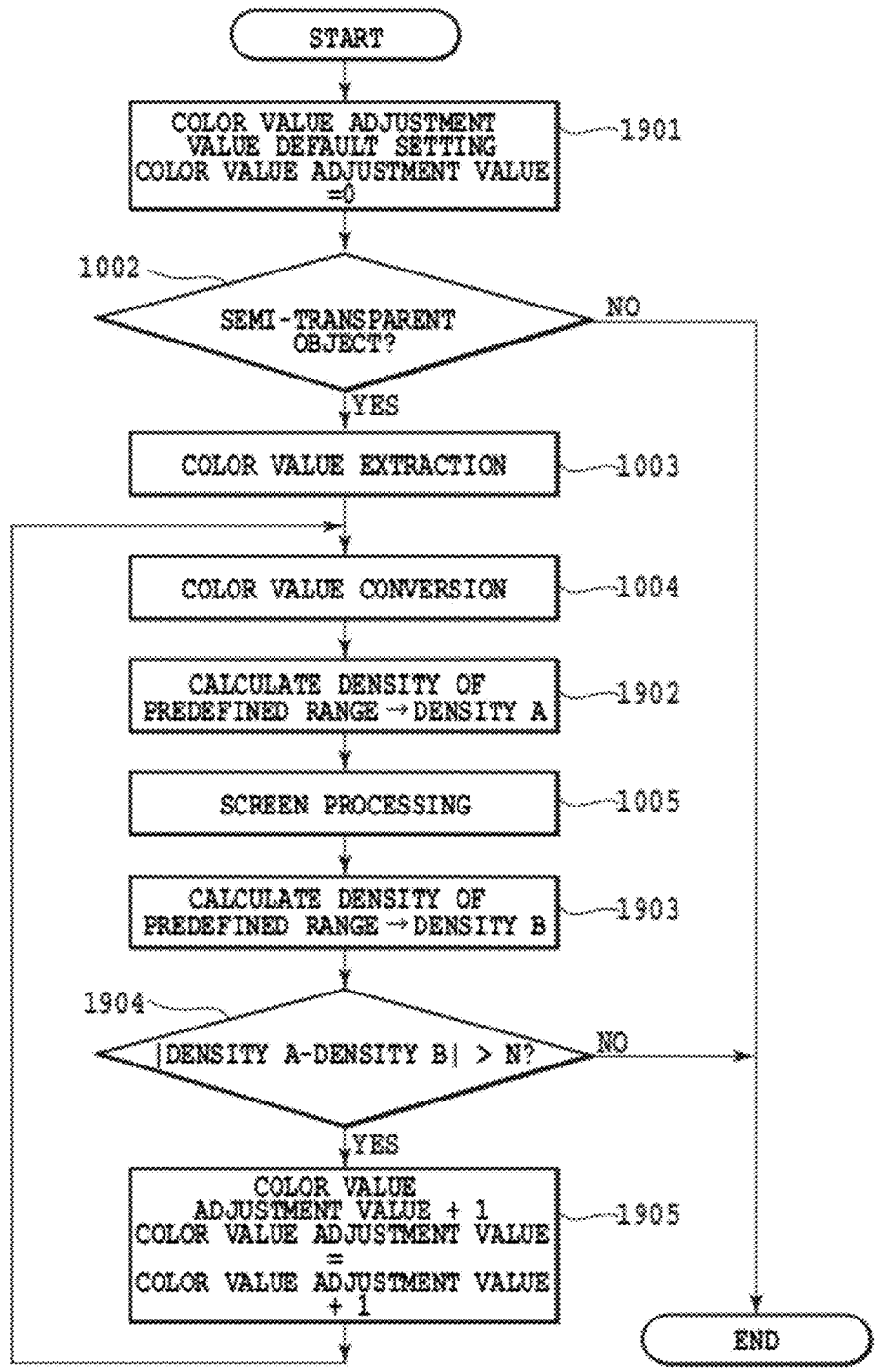
FIG. 19 is a flow chart illustrating the procedure of creating image data for printing according to an embodiment of the present invention.

Although the first embodiment allows the user to determine the pattern density adjustment by displaying the image after screen processing, an example of automating the above-mentioned user's determination will be described with the present embodiment using the flow chart of FIG. 19. Here, for each step of FIG. 19, like reference numerals are assigned to the steps similar to those in FIG. 10 and a detailed description thereof is omitted.

First, in step 1901, the CPU 11 executes default setting of the initial value of the adjusted color value. Specifically, an unadjusted state is provided by setting the adjusted color value equal to 0. The CPU 11 stores the adjusted color value in the RAM 13.

Next, in step 1002, the CPU 11 analyzes the PDL data to be defined as image data for printing with regard to whether or not a semi-transparent object is included in the PDL data created by an application as shown in FIG. 2. Specifically, as described in the first embodiment, extraction of the semi-transparent object of the object 301 shown in FIG. 3 is executed.

However, if there is no semi-transparent object, the process is simply terminated.

When a semi-transparent object is detected, the CPU 11 extracts, in step 1003, the color value (halftone value) for filling the semi-transparent object extracted in step 1002. With the object 301 of FIG. 3, for example, the value is 16 as shown in FIG. 7.

Next, in step 1004, the CPU 11 converts, according to the initial value of the adjusted color value preliminarily provided with a default setting in step 1901, the color value from the input color value into the output color value, using a conversion table shown in FIG. 12. Here, the table bearing the reference numeral 1201 is set as the default table which has been set up in step 1901, and the input value 16 is simply output as being 16. In this manner, the halftone value of the semi-transparent object is converted into the output value, whereby the halftone value of the semi-transparent object before screen processing is acquired.

Subsequently, the CPU 11 generates semi-transparent image data by overlaying the semi-transparent object whose halftone value has been converted and the PDL data to be rendered semi-transparent. In this case, the semi-transparent object and the PDL data to be rendered semi-transparent are not deleted from the RAM 13 and remain in the RAM 13. Here, the semi-transparent object remaining in the RAM 13 is the semi-transparent object before screen processing.

Next, in step 1902, the CPU 11 calculates the density of a predefined range of the generated semi-transparent image data such as the range of the 15×15 matrix shown in FIG. 7, and stores it in the RAM 13 as density A. In the case of FIG. 7, there are a total of 3328 levels for multi-value 64 gradations, and the number of dots that will be ideally arranged when binarized is 3328/64=52, resulting in a density of A=52. The density A is the number of dots that will be arranged (number of first dots) in a predefined range of semi-transparent image data before screen processing. Here, this step is passed through if density A is already acquired, such as when the process is continuing from step 1008.

Next, in step 1005, the CPU 11 executes screen processing on the generated semi-transparent image data by dither processing provided in the image processor. Binarization is executed using the dither shown in FIG. 6, for example. Since binarization has already been described in the conventional example, a detailed description will be omitted here. The result of binarization turns out to be the data shown in FIG. 8 (semi-transparent image data after screen processing).

Figure 8:
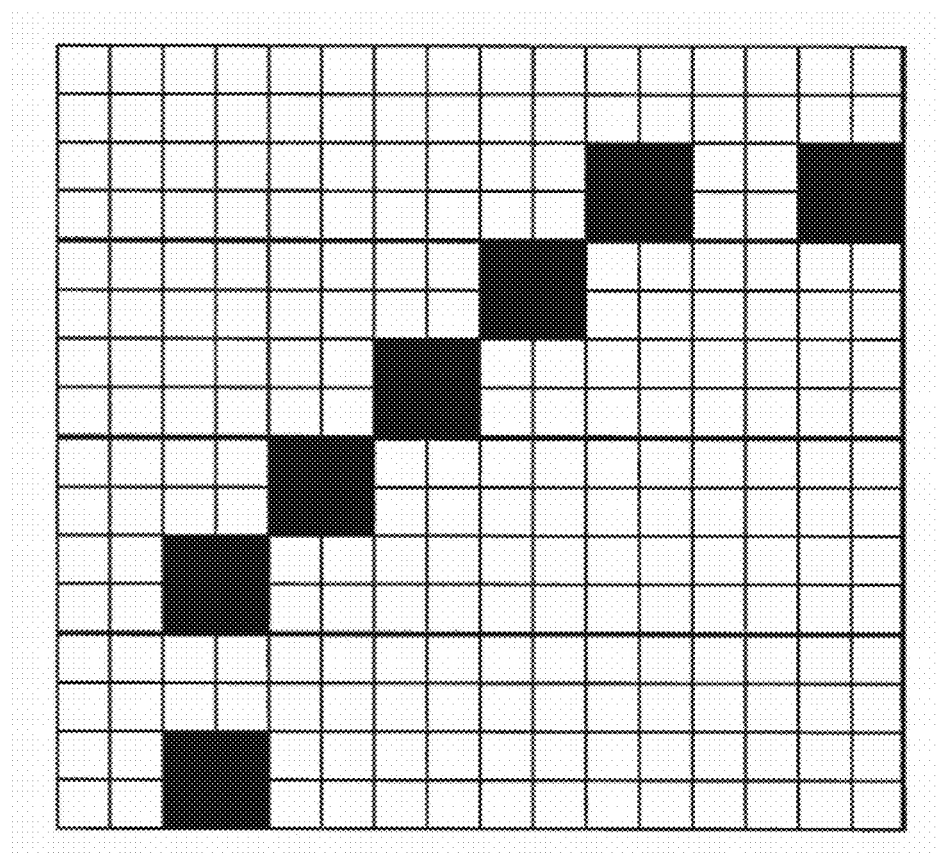
FIG. 8 illustrates the result of binarization by applying the dither of FIG. 6 to the input signal shown in FIG. 7.
Figure 9:
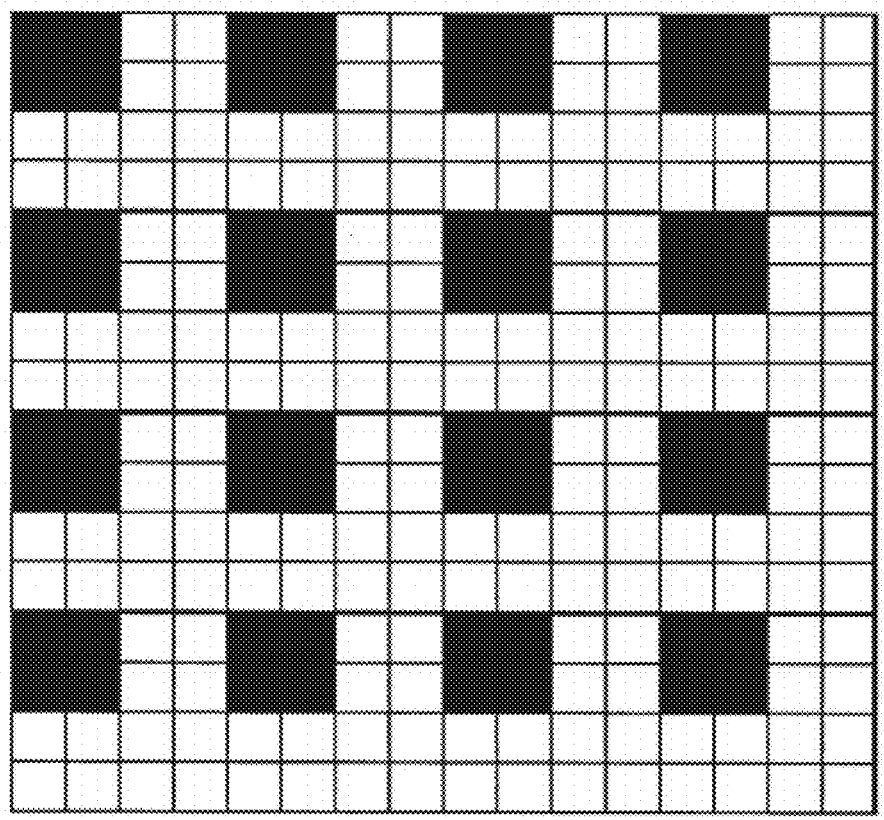
FIG. 9 illustrates the result of binarizing the object 503 of FIG. 5 by applying the dither of FIG. 6 thereto.

Next, in step 1903, the CPU 11 calculates the density of a predefined range of the binarized semi-transparent image data, such as the range of the 15×15 matrix shown in FIG. 8, and stores it in the RAM 13 as density B. In the case of FIG. 8, the number of dots that will be arranged when binarized is 24, resulting in a density of B=24. The density B is the number of dots that will be arranged (number of second dots) in a predefined range of semi-transparent image data after screen processing.

Next, in step 1904, the CPU 11 compares the number of dots within a predefined range of the semi-transparent image data before screen processing with that of the semi-transparent image data after screen processing, and calculates the difference between the input value (density A) and the output value (density B). Then, the absolute value of the difference is defined as the differential. Given the above, it is determined whether or not the differential is equal to or larger than a predefined value (threshold value). In other words, the CPU 11 reads density A and density B from the RAM and calculates the absolute value (differential) of the difference between density A and density B. Then, the CPU 11 determines whether or not the absolute value of the calculation result is equal to or larger than a predefined value, and determines whether or not the screen processed semi-transparent image data should be defined as image data for printing. It is needless to say that, being equal to or larger than a threshold value means that it is equal to or larger than the threshold value, and not being equal to or larger than a threshold value means that it is smaller than the threshold value.

In the following description, the predefined value is assumed to be 5. Here, density A=52 and density B=24, and thus the absolute value of the difference between the input value and the output value is 28, which exceeds the predefined value of 5.

Next, in step 1905, the CPU 11 adjusts the color value automatically by increasing the current adjusted color value of the semi-transparent object only by a predefined value. In other words, the CPU 11 increases the adjusted color value stored in the RAM 13 by +1.

Along with this increase, the CPU 11 sets up, in step 1004, the table 1202 of FIG. 12 as the table of adjusted color values which have been increased by +1 in step 1905, and modifies the input value from 16 to 20. Therefore, the CPU 11 converts (adjusts) the halftone value of the semi-transparent object stored in the RAM 13 before screen processing from 16 to 20. At this point, the semi-transparent object before screen processing is still stored in the RAM 13.

As thus described, if the differential of density is larger than or equal to the threshold value, the input value of the original (before dither processing) semi-transparent object is adjusted to be higher, such as increasing the value from 16 to 20.

Subsequently, the CPU 11 generates the semi-transparent image data by overlaying the semi-transparent object whose halftone value has been converted (adjusted higher, reset higher) and the PDL data to be rendered semi-transparent. In this manner, the semi-transparent image data is generated again from the semi-transparent object. Of course, the semi-transparent image data is generated at this point using the semi-transparent object after its halftone value has been modified. It is also needless to say that the semi-transparent object before screen processing and the PDL data to be rendered semi-transparent are stored in the RAM 13.

Although the CPU 11 proceeds to step 1902 next, the step is passed through in this occasion since density A has already been acquired.

Next, in step 1005, the CPU 11 executes screen processing on the generated semi-transparent image data by dither processing provided in the image processor. Similarly with the previous round, binarization is executed using the dither shown in FIG. 6. The result of binarization turns out to be the data shown in FIG. 15. As thus described, if the differential is larger than or equal to the threshold value, the semi-transparent object is input to step 1005 again that executes dither processing, via steps 1004 and 1902.

Figure 15:
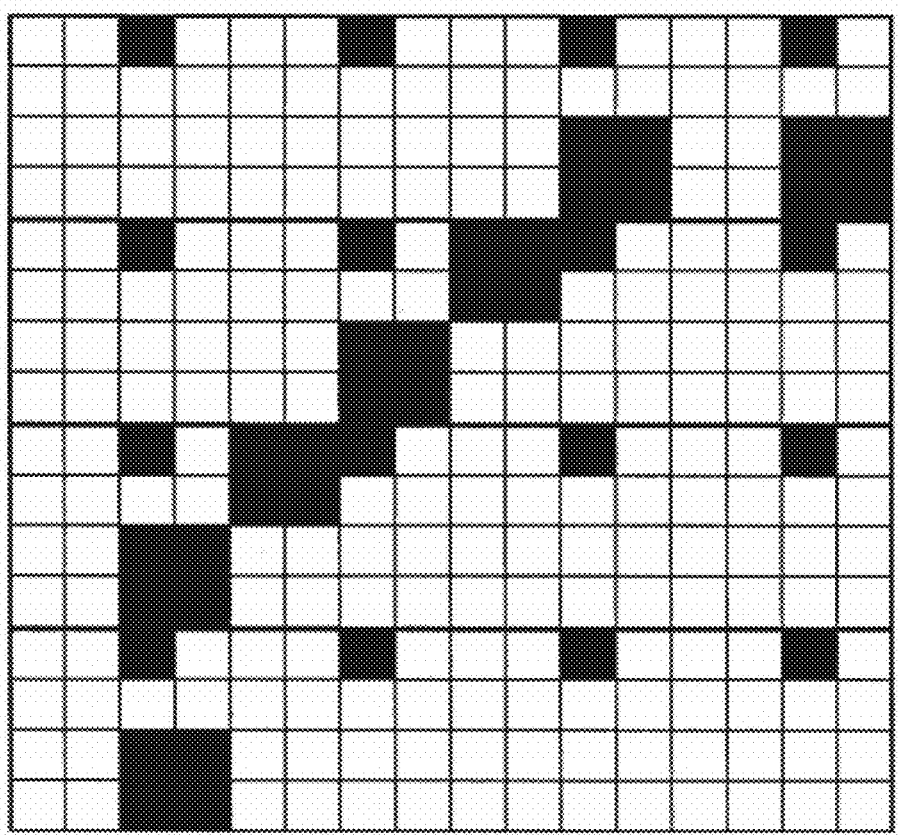
FIG. 15 illustrates the result of binarization by applying the dither shown in FIG. 6 to the semi-transparent image data shown in FIG. 14.

Next, in step 1903, the CPU 11 calculates the density of a predefined range of the generated semi-transparent image data, such as the range of the 15×15 matrix shown in FIG. 15, and updates the previous value stored in the RAM 13 with the result of calculation as density B. In the case of FIG. 15, the number of dots that will be arranged when binarized is 40, resulting in a density of B=40.

Next, in step 1904, the CPU 11 compares the number of dots within a predefined range of the semi-transparent image data before screen processing with that of the semi-transparent image data after screen processing, and determines whether or not the absolute value of the difference is equal to or larger than a predefined value. Here, density A=52 and density B=40, and thus the absolute value of the difference between the input value and the output value is 12, which exceeds the predefined value of 5.

Then the CPU 11 proceeds to step 1905 again, and increases the adjusted color value from the previous round by a predefined value of +1. That is, in addition to the previous round, the total increment becomes +2.

Next, in step 1004, the CPU 11 sets up the table 1203 of FIG. 12 as the table of adjusted color values which have been increased by +2 in step 1905, and modifies the input value from 16 to 24. Therefore, the CPU 11 converts (adjusts) the halftone value of the semi-transparent object stored in the RAM 13 before screen processing from 16 to 24. At this point, the semi-transparent object before screen processing is still stored in the RAM 13.

Subsequently, the CPU 11 generates semi-transparent image data by overlaying the semi-transparent object whose halftone value has been converted and the PDL data to be rendered semi-transparent. It is needless to say that, in this case, the semi-transparent object and the PDL data to be rendered semi-transparent are stored in the RAM 13.

Although the CPU 11 proceeds to step 1902 next, the step is passed through in this case since density A has already been acquired.

Next, in step 1005, the CPU 11 executes screen processing on the generated semi-transparent image data. Similarly with the previous round, binarization is executed using the dither shown in FIG. 6. The result of binarization turns out to be the data shown in FIG. 18.

Figure 18:
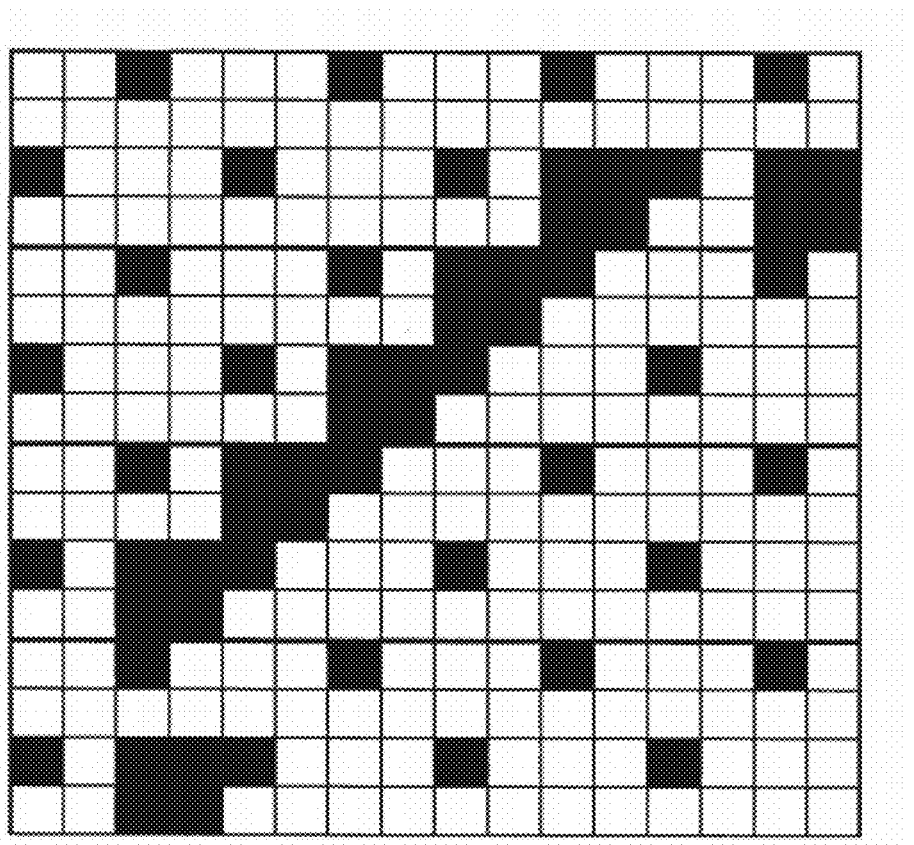
FIG. 18 illustrates the result of binarization by applying the dither shown in FIG. 6 to the semi-transparent image data shown in FIG. 17.

Next, in step 1903, the CPU 11 calculates the density of a predefined range of the binarized semi-transparent image data, such as the range of the 15×15 matrix shown in FIG. 18, and updates the previous value stored in the RAM 13 with the result of calculation as density B. In the case of FIG. 18, the number of dots that will be arranged when binarized is 56, resulting in a density of B=56.

Next, in step 1904, the CPU 11 compares the number of dots within a predefined range of the semi-transparent image data before screen processing with that of the semi-transparent image data after screen processing, and determines whether or not the difference between the input value and the output value is equal to or larger than a predefined value. Here, density A=52 and density B=56, thus the difference between the input value and the output value is 4, which is smaller than the predefined value of 5. Now that the absolute value of the difference between density A and density B has eventually become smaller than the predefined value of 5, the CPU 11 terminates the processing and proceeds to printing, although this step is not shown. In other words, the CPU 11 defines the semi-transparent image data as image data for printing, since the above absolute has become smaller than the predefined value.

As thus described, in the present embodiment, the CPU 11 compares the number of dots within a predefined range of the semi-transparent image data before screen processing with that of the semi-transparent image data after screen processing, and determines whether or not the difference between the input value and the output value is equal to or larger than a predefined value. The CPU 11 then modifies the halftone value of the semi-transparent object so that the difference is within the predefined value. Therefore, in addition to the effect of the first embodiment, the user can be spared the trouble of determining whether or not the result is desirable with the help of an automated determination.

Additionally, the criterion of the above automated determination can be controlled by modifying the predefined value (5 in the above description) to be compared with the absolute value of the difference between density A and density B. In other words, the smaller the set predefined value, the higher the quality of result that can be obtained, whereas a larger predefined value results in a somewhat degraded quality in exchange for a reduced processing time. Therefore, if the user wants to obtain a high quality result, a small predefined value should be chosen, whereas a large predefined value should be set if fast printing is desired without requiring as high a quality. In this manner, a result according to the user's request can be obtained.

(Third Embodiment)

Figure 20:
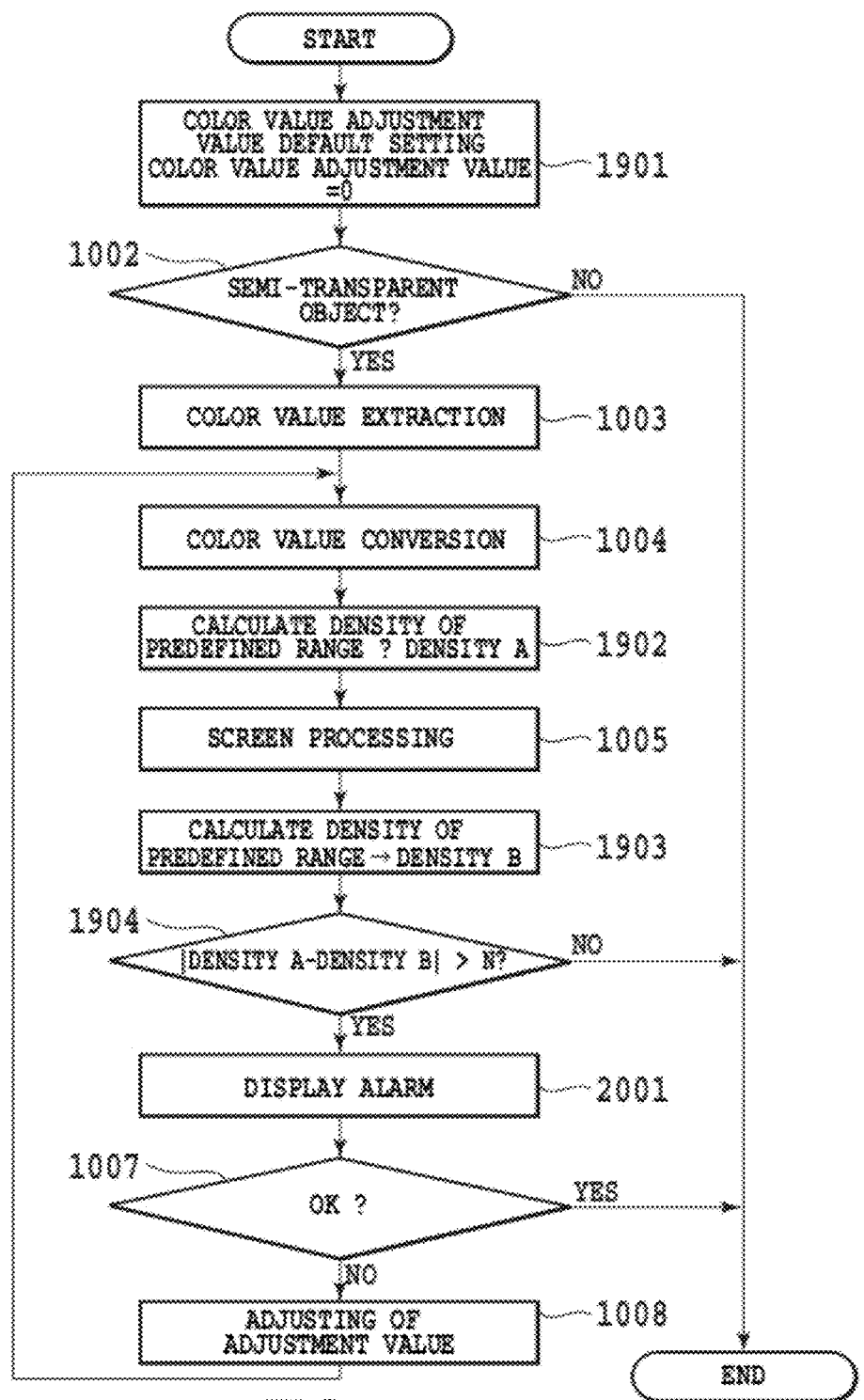
FIG. 20 is a flow chart illustrating the procedure of creating image data for printing according to an embodiment of the present invention.

Although the first embodiment described an example of letting the user determine the pattern density adjustment and the second embodiment described an example of automating the user's determination, the present embodiment describes, using the flow chart of FIG. 20, an example of displaying a warning and letting the user perform correction in a semiautomatic manner.

First, in step 1901, the CPU 11 executes default setting of the initial value of the adjusted color value. Specifically, an unadjusted state is provided by setting the adjusted color value equal to 0.

Next, in step 1002, the CPU 11 analyzes the PDL data to be defined as image data for printing with regard to whether or not a semi-transparent object is included in the PDL data created by an application as shown in FIG. 2. Specifically, the semi-transparent object of the object 301 shown in FIG. 3 is extracted. However, if there is no semi-transparent object, the process is simply terminated.

When a semi-transparent object is detected, the CPU 11 extracts, in step 1003, the color value (halftone value) for filling the semi-transparent object extracted in step 1002. With the object 301 of FIG. 3, for example, the value is 16 as shown in FIG. 7.

Next, in step 1004, the CPU 11 converts, according to the initial value of the adjusted color value preliminarily provided with a default setting in step 1901, the color value from the input color value into the output color value, using a conversion table shown in FIG. 12. Here, the table bearing the reference numeral 1201 is set as the default table which has been set up in step 1901, and the input value 16 is simply output as being 16. In this manner, the halftone value of the semi-transparent object is converted into the output value, whereby the halftone value of the semi-transparent object before screen processing is acquired.

Subsequently, the CPU 11 generates semi-transparent image data by overlaying the semi-transparent object whose halftone value has been converted and the PDL data to be rendered semi-transparent.

Next, in step 1902, the CPU 11 calculates the density of a predefined range of the generated semi-transparent image data, such as the range of the 15×15 matrix shown in FIG. 7, and stores the calculated density in the RAM 13 as density A. In the case of FIG. 7, there are a total of 3328 levels for multi-value 64 gradations, and the number of dots that will be ideally arranged when binarized is 3328/64=52, resulting in a density of A=52.

Next, in step 1005, the CPU 11 executes screen processing on the generated semi-transparent image data. Binarization is executed using the dither shown in FIG. 6, for example. Since binarization has already been described in the conventional example, a detailed description will be omitted here. The result of binarization turns out to be the data shown in FIG. 8.

Next, in step 1903, the CPU 11 calculates the density of a predefined range of the binarized semi-transparent image data such as the range of the 15×15 matrix shown in FIG. 8, and stores it in the RAM 13 as density B. In the case of FIG. 8, the number of dots that will be arranged when binarized is 24, resulting in a density of B=24.

Next, in step 1904, the CPU 11 compares the number of dots within a predefined range of the semi-transparent image data before screen processing with that of the semi-transparent image data after screen processing, and determines whether or not the absolute value of the difference between the input value and the output value is equal to or larger than a predefined value. In the following description, the predefined value is assumed to be 5. Here, density A=52 and density B=24, and thus the absolute value of the difference between the input value and the output value is 28, which exceeds the predefined value of 5.

The CPU 11 then proceeds to step 2001 and displays a numeric alarm on the display unit 15 warning that the predefined difference of 5 is outnumbered by 28. The user knows by the warning that the difference of density before and after screen processing is large, and provides an input to the image processor via the input operation unit 14 indicating that the user will proceed to adjustment processing of the adjusted color value. Based on the user's input, the CPU 11 determines that the current result is not OK (step 1007), and proceeds to adjustment processing of the adjusted color value of step 1008.

In this case, with the first embodiment, there was no other way for the user than to verify the difference on the screen. With the present embodiment, however, the user can see from the numeral whether or not to adjust the adjustment value larger: in this case, due to the large difference of 28, the adjustment value is adjusted by +2. Therefore, the user performs an adjustment of +2 on the pattern density adjustment bar 1101 using the input operation unit 14, and the CPU 11 acquires, based on the user's input, the adjusted color value.

Next, the CPU 11 returns to step 1004 and sets up the table 1203 as the table of adjusted color values which have been increased by +2 (adjusted color value) in step 1008, and modifies the input value from 16 to 24. In this manner, the halftone value of the semi-transparent object is converted into the output value, whereby the halftone value of the semi-transparent object before screen processing is acquired.

Subsequently, the CPU 11 generates semi-transparent image data by overlaying the semi-transparent object whose halftone value has been converted and the PDL data to be rendered semi-transparent.

Although the CPU 11 proceeds to step 1902 next, the step is passed through in this case since density A has already been acquired.

Next, in step 1005, the CPU 11 executes screen processing on the generated semi-transparent image data. Similarly with the previous round, binarization is executed using the dither shown in FIG. 6. The result of binarization turns out to be the data shown in FIG. 18.

Next, in step 1903, the CPU 11 calculates the density of a predefined range of the generated semi-transparent image data, such as the range of the 15×15 matrix shown in FIG. 18, and updates the previous value stored in the RAM 13 with the result of calculation as density B. In the case of FIG. 18, the number of dots that will be arranged when binarized is 56, resulting in a density of B=56.

Next, in step 1904, the CPU 11 compares the number of dots within a predefined range of the semi-transparent image data before screen processing with that of the semi-transparent image data after screen processing, and determines whether or not the difference between the input value and the output value is equal to or larger than a predefined value. Here, density A=52 and density B=56, and thus the difference between the input value and the output value is 4, which is smaller than the predefined value of 5. Now that the absolute value of the difference between density A and density B has eventually become smaller than the predefined value of 5, the CPU 11 terminates the processing and proceeds to printing, although not shown.

Specifically, the CPU 11 outputs the semi-transparent object after dither processing to the printer (output destination). Alternatively, the CPU 11 outputs the semi-transparent object whose halftone value has been already adjusted (to be 24) to the printer which, having executed dither processing again, prints the semi-transparent object. It is needless to say that, the dither processing executed in this case is identical to the dither processing executed in step 1005. In other words, the dither threshold value array used is identical.

As thus described, with the present embodiment, the number of dots within a predefined range of the semi-transparent image data before screen processing is compared with the number of dots of the semi-transparent image data after screen processing and, if the difference between the input value and the output value is larger than or equal to a predefined value, a warning with regard to the magnitude of the difference is displayed. Therefore, in addition to the effect of the first embodiment, it becomes easier for the user to determine how much the adjustment should be made.

(Fourth Embodiment)

Figure 21:
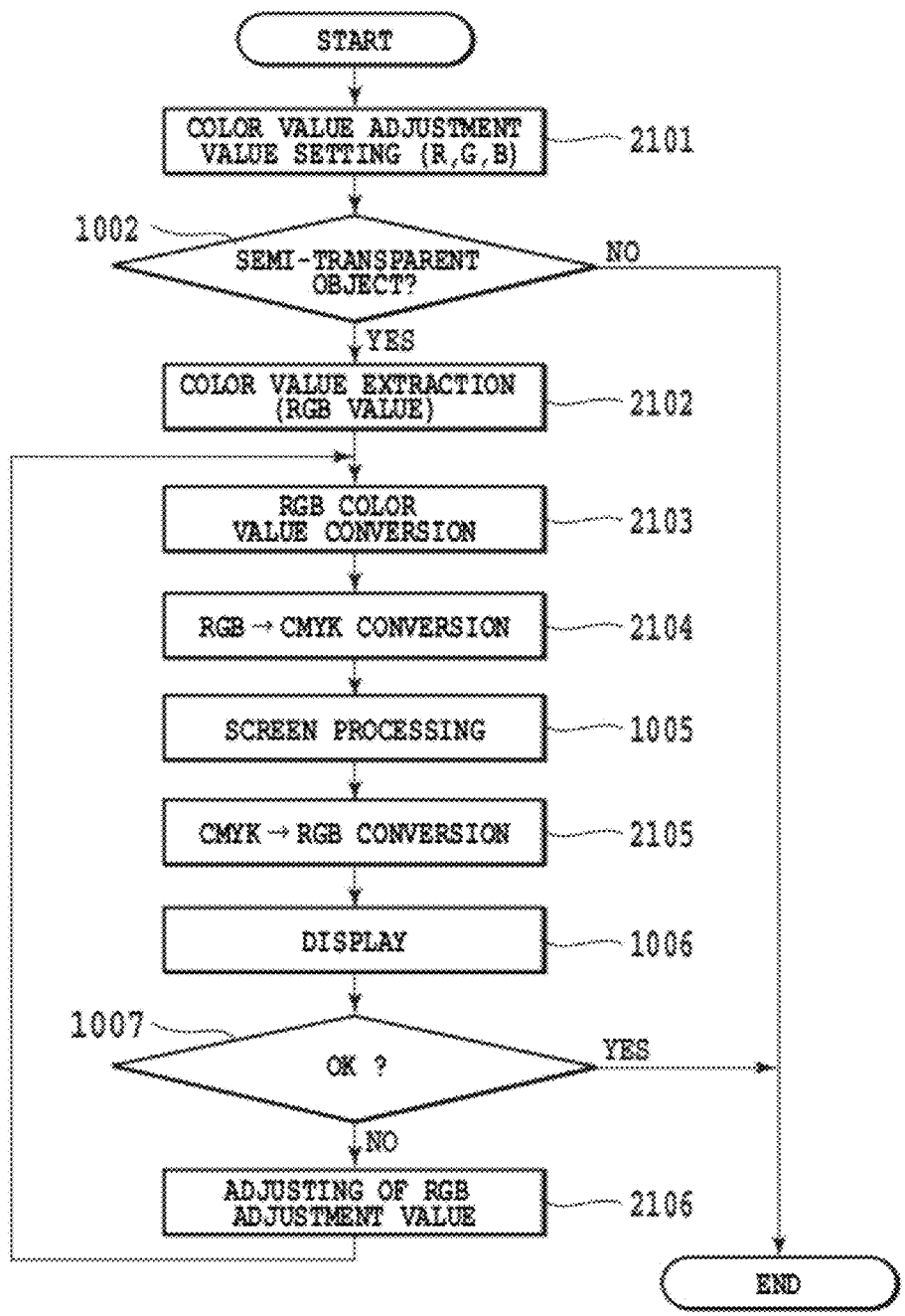
FIG. 21 is a flow chart illustrating the procedure of creating image data for printing according to an embodiment of the present invention.

Although, in the first embodiment, a case has been described in which the images to be printed are monochromatic, the present embodiment describes a processing of color images using the flow of FIG. 21.

In the present embodiment, since the image specified by the user is a color image, a semi-transparent object for each color is used. In other words, a semi-transparent object for overlaying on the Red data (semi-transparent object for R) is provided, from the PDL data, as the semi-transparent object. Similarly, a semi-transparent object for overlaying on the Green data (semi-transparent object for G) and a semi-transparent object for overlaying on the Blue data (semi-transparent object for B) are provided. The semi-transparent objects for R, G and B can be preliminarily stored in the ROM 12 or the like.

Figure 22:
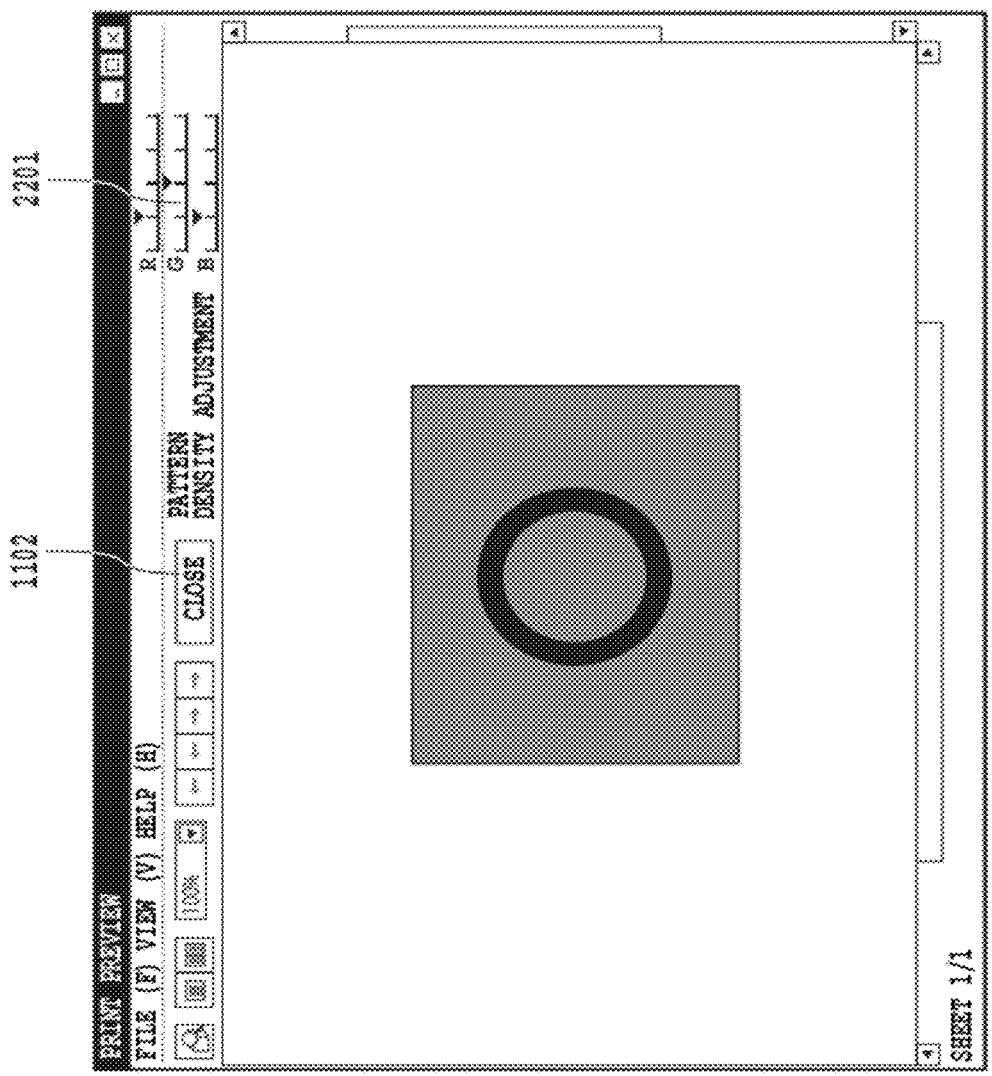
FIG. 22 illustrates an exemplary view displayed on the display unit according to an embodiment of the present invention.

In the present embodiment, the user is allowed to provide the adjusted color value setting for Red (R), Green (G) and Blue (B), respectively, as shown in the pattern density adjustment bar 2201 of FIG. 22. Therefore, when the user operates the pattern density bar 2201 via the input operation unit 14 to set the adjusted color value for each of the colors R, G and B, the CPU 11 defines, in step 2101, the values which have been set as initial values of the adjusted color value for respective colors. Then the values are stored in the RAM 13. Shipment may be made with the initial state staying in the middle, or unadjusted, so that it is possible to preliminarily set the adjustment according to the user's preference.

Note that, in FIG. 22, the background of the circle is light green.

Next, in step 1002, the CPU 11, analyzes the PDL data to be defined as image data for printing, with regard to whether or not semi-transparent objects for respective colors R, G and B are included in the PDL data which has been created in the application. If semi-transparent objects for respective colors R, G and B do not exist, the process is simply terminated.

Figure 23:
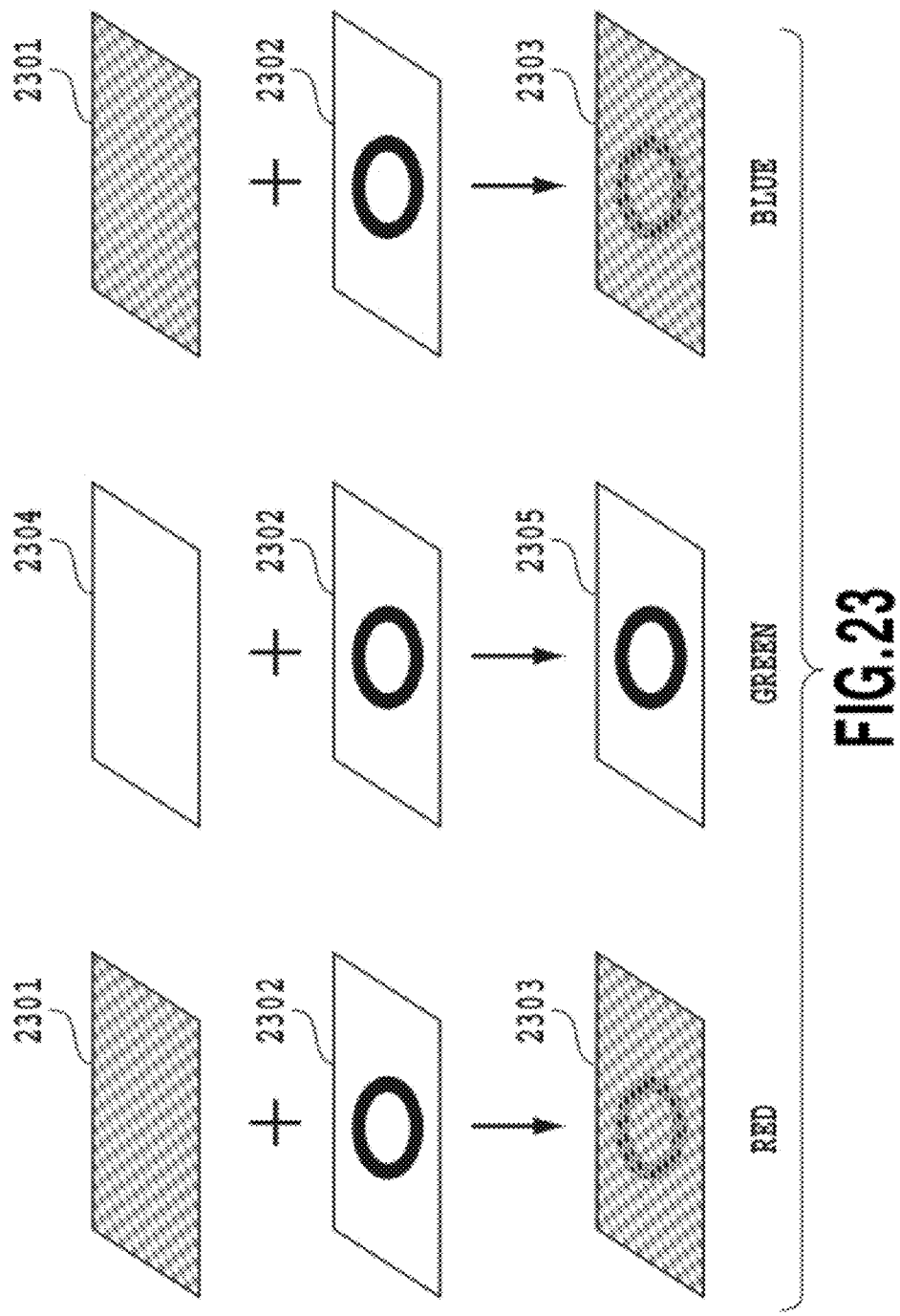
FIG. 23 illustrates how the object specified to be semi-transparent is created when semi-transparency is specified in the RGB colors, according to an embodiment of the present invention.

If semi-transparent objects for respective colors R, G and B are detected, the CPU 11 extracts, in step 2102, the color values for filling the semi-transparent objects acquired in step 1002 for respective colors R, G and B. For example, when the background color to be rendered semi-transparent is light green, the color values are (R,G,B)=(204,255,204), each of which appears as shown in FIG. 23 for the colors Red, Green and Blue.

A description will be provided dividing each of the colors Red, Green and Blue into channels. First, since the underlying object on which the semi-transparent object is overlaid is a black circle, the channel of each of the colors Red, Green and Blue turns out to be the same object bearing the reference numeral 2302.

Next, the semi-transparent object will be described. Starting from the description of the Red channel, in order to create a filled portion and an unfilled portion through which the underlying object can be seen due to specifying the object to be semi-transparent, an object having a lattice pattern (semi-transparent object) 2301 is drawn with Red=204, where the degree of filling being reduced by a certain interval. Next, the underlying object 2302 is drawn. Finally, the two objects 2301 and 2302 are overlaid, thereby drawing an object 2303. Next, the case of Green channel will be described. Since the color specification of the background to be rendered semi-transparent is Green=255, the filling color turns out to be white, in other words, the object is drawn without being filled, as with the object 2304.

Next, the underlying object 2302 is drawn. Finally, the two objects 2304 and 2302 are overlaid, which results in drawing an object 2305.

Next, the case of Blue channel will be described. In order to create a filled portion and an unfilled portion through which the underlying object can be seen due to specifying the object to be semi-transparent, an object having a lattice pattern (semi-transparent object) 2301 is drawn with Blue=204, where the degree of filling is reduced by a certain interval. This part, having the same value as with Red, turns out to be the same pattern. Next, the underlying object 2302 is drawn. Finally, the two objects 2301 and 2302 are overlaid, which results in drawing an object 2303. By channel synthesizing the objects 2303 and 2305 of the colors Red, Green and Blue, the final color image is completed. From the finished color image, it can be seen that semi-transparent is achieved in such a manner that the circle included in object 2302 is drawn to be visible through the specified filling color (light green in this case) extracted in the filling color specification 2102.

Figure 24:
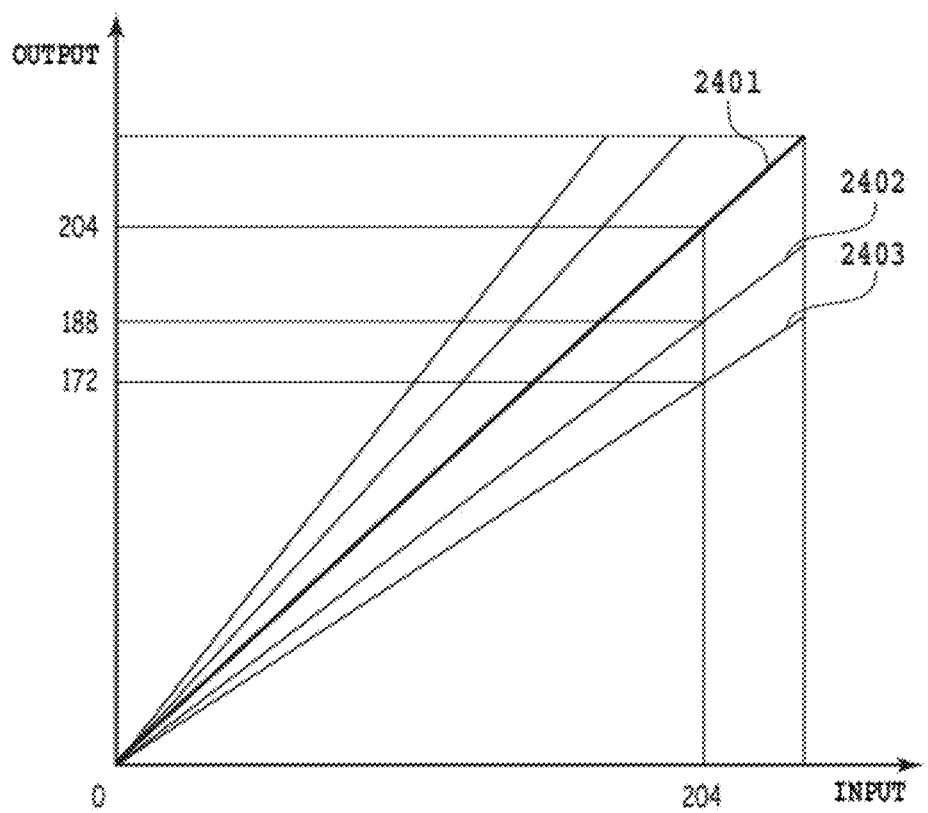
FIG. 24 is an explanatory illustration of a table for use in the color value conversion according to an embodiment of the present invention.

Next, in step 2103, the CPU 11 converts the color value from the input color value into the output color value using the conversion table shown in FIG. 24 according to the adjusted color value setting which has been preliminarily set in step 2101 or the color value adjusted in step 2106. Here, a table bearing the reference numeral 2401 is set as the initial value. Thus, for colors R and B, for example, the halftone value 204 of the semi-transparent object for R and the semi-transparent object for B is simply output as 204 as input value. The difference with the first embodiment is that, since RGB indicates brightness, table 2401 is modified to table 2402 for a deeper density. In this manner, the halftone value of the semi-transparent objects for respective colors R, G and B is converted.

Subsequently, the CPU 11 generates semi-transparent image data for R, G and B, respectively by overlaying the semi-transparent object for respective colors R, G and B whose halftone value has been converted and respective R, G and B data of the PDL data to be rendered semi-transparent.

In other words, the CPU 11 generates semi-transparent image data for R by overlaying the semi-transparent object for R whose halftone value has been converted and the Red data of the PDL data to be rendered semi-transparent. In this case, as described with the first embodiment, the semi-transparent object for R whose halftone value has been converted and the Red data of the PDL data to be rendered semi-transparent are not deleted from the RAM 13 and remain therein. Similarly, the CPU 11 generates semi-transparent image data for G by overlaying the semi-transparent object for G whose halftone value has been converted and the Green data of the PDL data to be rendered semi-transparent. The semi-transparent object for G whose halftone value has been converted and the Green data of the PDL data to be rendered semi-transparent are also left without being deleted from the RAM 13. Furthermore, the CPU 11 generates semi-transparent image data for B by overlaying the semi-transparent object for B whose halftone value has been converted and the Blue data of the PDL data to be rendered semi-transparent. The semi-transparent object for B whose halftone value has been converted and the Blue data of the PDL data to be rendered semi-transparent also remain in the RAM 13 without being deleted.

Now, the semi-transparent objects for respective colors R, G and B remaining in the RAM 13 are semi-transparent objects before screen processing.

In the case of color printing, the printer used for printing typically outputs in Cyan(C), Magenta(M), Yellow(Y) and Black(K). Therefore, screen processing is also executed in Cyan, Magenta, Yellow and Black, and the CPU 11 converts the input RGB signal from RGB to CMYK, in step 2104. In other words, the CPU 11 executes color conversion on the generated R, G and B semi-transparent image data to generate C, M, Y and K semi-transparent image data. Color conversion from RGB to a CMYK is executed by color management processing using color profile processing or the like.

Next, as shown in the first embodiment which has described a monochrome example, the CPU 11 executes, in step 1005, screen processing on C, M, Y and K semi-transparent image data. As screen processing, binarization is executed using the dither which has been set in Cyan, Magenta, Yellow and Black of respective colors, similarly with the case of binarization using the dither shown in FIG. 6 as a processing on a monochrome image, for example. In this case, a semi-transparent object disappears due to monochrome screen processing, and it may also disappear in the case of a color image due to interference by dither, as with a monochrome image.

Next, since the image after screen processing is data of Cyan, Magenta, Yellow and Black, it is required to be converted into RGB data to be displayed on the screen of the display unit 15. Thus, in step 2105, the CPU 11 converts the data from CMYK to RGB to convert the screen processed C, M, Y and K semi-transparent image data into the corresponding R, G and B data. Also the color conversion from CMYK into RGB is executed by color management processing using color profile processing.

Next, in step 1006, the CPU 11 displays, on the display unit 15, R, G and B data which has been converted in step 2105 to confirm whether or not the semi-transparent object which originally existed has disappeared due to screen processing.

Next, in step 1007, the CPU 11 examines, as with the first embodiment, whether or not the result is OK. If the result of verification is not OK, the CPU 11 proceeds to step 2106 and adjusts the color value of each of the RGB colors. In this case, the user adjusts the pattern density adjustment bar 2201 of FIG. 22 to switch from table 2401 to table 2402 or table 2403 so that the adjustment table of FIG. 24 represents deeper colors. Upon receiving the user's input with regard to adjustment, the CPU 11 acquires adjusted color values (R, G, B) corresponding to the user's input.

After the adjustment in step 2106, the CPU 11 returns again to the RGB color value conversion of step 2103 to process each color, and displays the result on the display unit 15 in step 1006. Then the CPU 11 examines the result and terminates the processing if the result is OK, whereas the CPU 11 executes the adjustment again using the pattern density adjustment bar 2201 of FIG. 22 in the RGB adjustment value adjustment of step 2106, if the result is not OK.

In step 1007, if the semi-transparent object turns out to be OK in comparison with the original image as the result of the density adjustment, the print preview is terminated and the CPU 11 proceeds to printing.

In the present embodiment, as thus described, it becomes possible to output an image with a density close to the original by simply modifying the density of the halftone pattern (halftone value) of the semi-transparent object by the present method using color data, as with monochromatic data. Additionally, since dither of the screen processing is not modified, it is possible to simply apply the dither representing the intention of the designer or the user who is attempting, as the original purpose, to smoothly reproduce the image in a uniform color or gradation, and reproduce the image without degrading the reproducibility of the semi-transparent object. Furthermore, only the density of the semi-transparent object needs to be adjusted using a simple conversion, such as that shown in FIG. 24, without requiring any advanced processing, such as conventional frequency analysis. Therefore, processing by software is not time-consuming, and when processing by hardware, a simple circuit can be used without scaling-up the hardware.

(Other Embodiments)

The present invention can either be applied to a system comprising a plurality of units (e.g., a computer, an interface device, a reader, a printer, etc.), or applied to an apparatus comprising a single unit (a compound machine, a printer, a facsimile machine, etc.).

A processing method of storing, in a storage medium, a program which causes the arrangement of the above-mentioned embodiment to operate so as to realize the functionality of the above-mentioned embodiment; reading out the program stored in the storage medium as codes; and executing the program on a computer is also included in the scope of the above-mentioned embodiment. In other words, computer readable storage media are included in the scope of the embodiments. Additionally, it is needless to say that the computer program in itself is included in the above-mentioned embodiment as with the storage medium in which the above-mentioned computer program is stored.

As such storage media, floppy (registered trademark) disks, hard-disks, optical disks, magneto-optical disks, CD-ROM, magnetic tapes, non-volatile memory cards, ROM, for example, can be used.

Additionally, the method is not limited to one that executes the processing with a single program stored in the above-mentioned storage media, but extends to any method operating on the OS and executes the operation of the above-mentioned embodiment in conjunction with functionality of other software or extended board may also be included in the scope of the above-mentioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-284074, filed Oct. 31, 2007, which is hereby incorporated by reference herein in its entirety.

What is claimed is:

1. An apparatus comprising:
 a processor;
 a memory configured to store a program instructing the processor to function as:
  a detection component configured to detect a semi-transparent object including opaque pixels and transparent pixels;
  a changing component configured to change color values of the opaque pixels of the detected semi-transparent object;
  an overlaying component configured to overlay the semi-transparent object whose opaque pixels have the changed color values on another object to obtain an overlaid image; and
  a dither process component configured to apply a dither matrix to the overlaid image, the overlaid image including pixels corresponding to the opaque pixels and pixels corresponding to the transparent pixels,
  wherein the pixels of the overlaid image corresponding to the opaque pixels have the changed color values, and the pixels of the overlaid image corresponding to the transparent pixels have color values that are the same as the color values of the another object.

2. The apparatus according to claim 1, wherein the changing component is configured to change color values of the opaque pixels so as to reduce the difference between the average density of the semi-transparent object and the density of an image to be obtained by applying the dither matrix to the semi-transparent object whose opaque-pixel color values have been changed.

3. The apparatus according to claim 1, wherein the color values are degrees of darkness of the opaque pixels of the semi-transparent object.

4. The apparatus according to claim 1, wherein the changing performed by the changing component includes deepening.

5. The apparatus according to claim 1, wherein the changing component is configured to change the color values of the opaque pixels of the detected semi-transparent object using a table.

6. A method comprising:
 a detecting step of detecting a semi-transparent object including opaque pixels and transparent;
 a changing step of changing the color values of the opaque pixels of the detected semi-transparent object;
 an overlaying step of overlaying the semi-transparent object whose opaque pixels have the changed color values on another object to obtain an overlaid image; and
 a dither process step of applying a dither matrix to the overlaid image, the overlaid image including pixels corresponding to the opaque pixels and pixels corresponding to the transparent pixels,
 wherein the pixels of the overlaid image corresponding to the opaque pixels have the changed color values, and the pixels of the overlaid image corresponding to the transparent pixels have color values that are the same as the color values of the another object.

7. A non-transitory computer-readable recording medium storing computer-executable instructions for performing a method, the method comprising:
- a detecting step of detecting a semi-transparent object including opaque pixels and transparent pixels;
- a changing step of changing the color values of the opaque pixels of the detected semi-transparent object;
- an overlaying step of overlaying the semi-transparent object whose opaque pixels have the changed color values on another object to obtain an overlaid image; and
- a dither process step of applying a dither matrix to the overlaid image, the overlaid image including pixels corresponding to the opaque pixels and pixels corresponding to the transparent pixels,
- wherein the pixels of the overlaid image corresponding to the opaque pixels have the changed color values, and the pixels of the overlaid image corresponding to the transparent pixels have color values that are the same as the color values of the another object.

* * * * *